United States Patent [19]
Hamada et al.

[11] Patent Number: 5,892,991
[45] Date of Patent: Apr. 6, 1999

[54] CAMERA CAPABLE OF DISPLAYING THE LEVEL OF VISUAL EFFECT

[75] Inventors: Masataka Hamada, Osakasayama; Shigeto Ohmori; Atsuhisa Ohno, both of Sakai; Takehiro Katoh, Nara; Hiroshi Ootsuka, Sakai, all of Japan

[73] Assignee: Minolta Co., Ltd., Osaka, Japan

[21] Appl. No.: 794,309

[22] Filed: Feb. 3, 1997

Related U.S. Application Data

[63] Continuation of Ser. No. 357,979, Dec. 16, 1994, which is a continuation of Ser. No. 287,410, Aug. 8, 1994, which is a continuation of Ser. No. 875,648, Apr. 28, 1992.

[30] Foreign Application Priority Data

| Apr. 30, 1991 | [JP] | Japan | 3-099008 |
| Apr. 30, 1991 | [JP] | Japan | 3-099009 |
| Apr. 30, 1991 | [JP] | Japan | 3-099010 |
| May 27, 1991 | [JP] | Japan | 3-152424 |

[51] Int. Cl.$^6$ .................................................. G03B 13/30
[52] U.S. Cl. ........................... 396/147; 396/239; 396/291
[58] Field of Search ..................................... 396/147, 290, 396/291, 238, 239

[56] References Cited

U.S. PATENT DOCUMENTS

| 4,219,261 | 8/1980 | Rosner et al. | 354/412 |
| 4,243,308 | 1/1981 | Yamada et al. | 354/412 |
| 4,309,091 | 1/1982 | Fukuhara et al. | 354/432 |
| 4,341,451 | 7/1982 | Krueger et al. | 354/472 |
| 4,527,053 | 7/1985 | Kinoshita et al. | 354/406 |
| 4,529,291 | 7/1985 | Mizogui | 354/443 |
| 4,786,934 | 11/1988 | Kunze et al. | 354/409 |
| 5,019,852 | 5/1991 | Yamamoto et al. | 354/409 |
| 5,023,650 | 6/1991 | Hoshino et al. | 354/441 |
| 5,070,352 | 12/1991 | Kotani et al. | 354/412 X |
| 5,113,217 | 5/1992 | Izumi et al. | 354/471 |
| 5,142,320 | 8/1992 | Nakano et al. | 354/471 |
| 5,146,263 | 9/1992 | Kataoka | 354/430 |
| 5,166,723 | 11/1992 | Yoshida et al. | 354/430 |
| 5,170,205 | 12/1992 | Satoh et al. | 354/442 X |
| 5,621,495 | 4/1997 | Yamamoto et al. | 396/291 |

FOREIGN PATENT DOCUMENTS

| 61-55618 | 3/1986 | Japan . |
| 2-124543 | 5/1990 | Japan . |
| 2-126251 | 5/1990 | Japan . |

*Primary Examiner*—Russell Adams
*Attorney, Agent, or Firm*—Burns, Doane, Swecker & Mathis, LLP

[57] ABSTRACT

A camera is provided with a photographing device for setting various photographing conditions which determine a state of a subject image to be obtained as a picture, the photography device including an exposure device having a plurality of selectively settable exposure modes for automatically setting at least one exposure value based on brightness of a subject, a mode selector for selecting one of the plurality of exposure modes, a calculation unit for calculating an amount indicative of the state of the subject image in accordance with the photographing conditions set by the photography device, an estimation unit for estimating visual effects which the subject image provides based on the calculated state amount, and a display device for displaying the visual effect corresponding to the exposure mode selected by the mode selection means in accordance with the estimated visual effects. Accordingly, an operator of the camera is allowed to conceive before an exposing operation what the final picture will look like in accordance with the photographing conditions set in a variety of exposure modes.

16 Claims, 32 Drawing Sheets

| LEVEL | DISPLAY STATE |
|---|---|
| 1 |  |
| 2 |  |
| 3 |  |
| 4 |  |
| 5 |  |

| LEVEL | DISPLAY STATE |
|---|---|
| 5 |  |
| 4 |  |
| 3 |  |
| 2 |  |
| 1 |  |

CAMERA CAPABLE OF DISPLAYING THE LEVEL OF VISUAL EFFECT

This application is a continuation of application Ser. No. 08/357,979, filed Dec. 16, 1994, which is a continuation of application Ser. No. 08/287,410, filed Aug. 8, 1994, which is a continuation of application Ser. No. 07/875,648, filed Apr. 28, 1992.

BACKGROUND OF THE INVENTION AND RELATED ART STATEMENT (1) Field of the Invention This invention relates to a camera and, more particularly to a camera capable of displaying the level of visual effects of a subject image which will be found in a final picture, as determined according to photographing settings.

(2) Description of the Prior Art

Recently, there has been known a camera provided with a plurality of exposure modes so that a camera operator can enjoy a variety of visual effects the camera can provide in taking pictures. Among such exposure modes are known a program mode in which photographing settings such as aperture value AV and shutter speed TV are calculated in accordance with a preset program line, aperture priority mode and shutter speed priority mode in which the aperture value and shutter speed are manually settable respectively, and a manual mode in which both the aperture value and shutter speed are manually settable. Hereafter, the program mode, aperture priority mode, shutter speed priority mode, and manual mode are respectively referred to as the P-mode, A-mode, S-mode, and M-mode.

As functions of the camera are enhanced, the operators have had to acquire more skills to obtain a final picture that he/she desires.

For instance, in taking pictures, there are cases where the operator wants not only to expose a main subject as he/she aims, but also to expose a background subject as he/she aims. It has been known to depend upon a ratio of the distance to the main subject to the distance to the background subject, focal length of the taking lens, etc. in addition to the depth of field, to determine how unsharp the background image looks in the final picture.

With the existing cameras, it has been only possible for operators skilled and experienced in photography to obtain a final picture whose background image looks as unsharp as he/she desired by taking a picture only with a fixed focal length of the taking lens.

For the purpose of visually predicting how the final picture will look, a camera of the following type has been proposed in Unexamined Japanese Patent Publication No. 1-235934. In this camera, a depth/distance value is calculated based on the distance to a main subject, focal length and aperture value of a taking lens. The depth of field impression, i.e., how much or less depth of field a final picture will provide, is estimated based on the depth/distance value: and a degree of depth of field in the final picture and that of panning are predictively displayed on a viewfinder screen.

However, the depth of field impression described in the above publication is nothing but an index quantitatively indicating at what rate the image behind the main subject becomes unsharp in the final picture and does not take it into account how distant the background subject is from the main subject. Accordingly, it is impossible to know a difference in unsharpness of the background subject image in the final picture between a case where the background subject is distant from the main subject and another case where it is near the main subject. Therefore, it is quite difficult, if not impossible, to visually predict the unsharpness of the background subject image relative to the main subject image, that is, to what degree the main subject image stands out of the background subject image in the final picture.

In addition, the above publication does not mention how the visual effects can be displayed in relation to a set exposure mode in the case where the camera is provided with a plurality of exposure modes, and a desired exposure mode is selected out of those.

Neither does the above publication disclose a construction in which an action level of a main subject image in the final picture, i.e., how active or how still the main subject image will look in the final picture, is predictively displayed based on a moving speed of the main subject. Unexamined Japanese Patent Publication No. 2-126251 discloses a camera capable of detecting a camera shaking speed on an operator's side, determining a camera shake amount based on the detected camera shaking speed, and displaying the determined camera shake amount with the use of bars. However, this camera does not take actual movement of a main subject into account. Neither does this camera mention visual effects in the final picture, i.e., to what degree the main subject image looks active in the final picture, relative to the same movement of the main subject. Moreover, this camera is in no relation to a camera which displays the level of the visual effects in accordance with a selected exposure mode. Similarly to the former publication, the latter publication does not mention the relationship between the display of the level of the visual effects and exposure mode.

SUMMARY OF THE INVENTION

An object of the invention is to provide a camera capable of setting a variety of photographing conditions which allows a camera operator to sufficiently visualize what a final picture will look like, under the set photographing conditions, before an exposure operation.

Another object of the invention is to provide a camera in which an exposure mode is selectively settable out of a plurality of exposure modes, the camera being capable of switching a display manner of visual effects to a proper one in accordance with the set exposure mode.

A further object of the invention is to provide a camera with which even a beginner unskilled and unexperienced in complicated exposure adjustment can easily adjust exposure control values to reliably obtain a final picture providing visual effects that he/she desires.

Still another object of the invention is to provide a camera capable of properly estimating unsharpness of a background image in a final picture, i.e., how much a main subject image will stand out of a background subject image in the final picture in consideration of variables such as set aperture value, focal length of a taking lens, distance to a main subject, and distance to a background subject.

A still further object of the invention is to provide a camera capable of properly estimating an active state of a main subject image in a final picture, i.e., how active or how still the main subject image will look in the final picture in consideration of variables such as a set shutter speed and a relative speed of movement of the main subject and that of the camera.

An additional object of the invention is to provide a camera which allows a camera operator to confirm what a final picture will look like under the set photographing conditions while viewing an actual subject image to be photographed.

Another additional object of the invention is to provide a camera that can automatically execute exposure control to obtain visual effects a camera operator aims to achieve merely by setting the same in the camera.

Accordingly, the invention is directed to a camera comprising photography means for setting various photographing conditions which determine a state of a subject image to be obtained as a picture, the photography means including exposure means having a plurality of selectively settable exposure modes for automatically setting at least one exposure value based on brightness of a subject, mode selection means for selecting one of the plurality of exposure modes, calculation means for calculating an amount indicative of the state of the subject image in accordance with the photographing conditions set by the photography means, estimation means for estimating visual effects which the subject image provides based on the calculated state amount, and display means for displaying the visual effect corresponding to the exposure mode selected by the mode selection means in accordance with the estimated visual effects.

Also, the invention is directed to a camera comprising photography means for setting various photographing conditions which determine a state of a subject image to be obtained as a picture, the photography means including a plurality of control means for determining an exposure value, changer means for causing one of the plurality of control means to change the exposure value, calculation means for calculating an amount indicative of the state of the subject image in accordance with the photographing conditions set by the photography means, estimation means for estimating visual effects which the subject image provides based on the calculated state amount, and display means for displaying the visual effect corresponding to the control means operated by the changer means in accordance with the estimated visual effects.

Further, the invention is directed to a camera comprising photographing means for setting various photographing conditions which determine a state of a subject image to be obtained as a picture, the photography means including means for setting a control amount of an exposure value and a viewfinder for providing a subject image, calculation means for calculating an amount indicative of the state of the subject image in accordance with the photographing conditions of the photography means determined based on the control amount set by the setting means, estimation means for estimating visual effects which the subject image provides based on the calculated state amount, and display means for displaying the estimated visual effects on the subject image formed in the viewfinder.

Moreover, the invention is directed to a camera comprising photography means for setting various photographing conditions which determine a state of a subject image to be obtained as a picture, the photography means including a plurality of selectively settable exposure modes, mode selection means for selecting one of the plurality of the exposure modes, calculation means for calculating an amount indicative of the state of the subject image in accordance with the photographing conditions set by the photography means, estimation means for estimating visual effects which the subject image provides based on the calculated state amount, display means for displaying the estimated visual effects, the display means having an operative state of displaying the result of the estimation means and an inoperative state of not displaying the result of the estimation means, and switch means for switching the state of the display means between the operative state and the inoperative state in accordance with the exposure mode selected by the mode selection means.

Furthermore, the invention is directed to a camera comprising photographing means for setting various photographing conditions which determine a state of a subject image to be obtained as a picture, the photography means including means for manually setting a control amount of an exposure value, calculation means for calculating an amount indicative of the state of the subject image in accordance with the photographing conditions of the photographing means determined based on the control amount set by the setting means, estimation means for estimating visual effects which the subject image provides based on the calculated state amount, display means for displaying the estimation result, the display means being switchable between an operative state of displaying the estimation result and an inoperative state of not displaying the estimation result, and selection means manually operable for selecting the operative state of the display means.

In addition, the invention is directed to a camera comprising photography means including a taking lens unit, means for setting an aperture value of the photography means, first means for detecting a focal length of the taking lens unit, second means for detecting the distance to a main subject, first calculation means for calculating a distance factor of the distance to the main subject to the distance to a background subject, second calculation means for calculating an amount of unsharpness of a background subject image relative to a main subject image in accordance with the set aperture value, the detected focal length, the detected main subject distance, and the calculated distance factor, and estimation means for estimating, based on the calculated amount of unsharpness, visual effects provided by a subject image obtainable under the set aperture value.

Further, the invention is directed to a camera comprising photography means capable of setting a variable aperture value, setting means for setting a desired amount of unsharpness of a background subject image relative to a main subject image, and control means for controlling the aperture value of the photography means so as to obtain the set amount of unsharpness.

Also, the invention is directed to a camera comprising photography means including a taking lens unit and a shutter device, setting means for setting a shutter speed of the shutter device, first detector means for detecting a focal length of the taking lens unit, second detector means for detecting a speed of a main subject relative to the photography means by using light passed through the taking lens unit, calculation means for calculating a blurring amount of the main subject in accordance with the set shutter speed, the detected focal length and relative speed, and estimation means for estimating, based on the calculated blurring amount, visual effects provided by a subject image obtainable under the set shutter speed.

Moreover, the invention is directed to a camera comprising photography means including a shutter device, setting means for setting a shutter speed of the shutter device, detector means for detecting a moving speed of a main subject relative to the camera, calculation means for calculating a blurring amount of the main subject in accordance with the set shutter speed and detected relative speed, and estimation means for estimating, based on the calculated blurring amount, visual effects provided by a subject image obtainable under the set shutter speed.

These and other objects, features and advantages of the present invention will become more apparent upon a reading of the following detailed description and accompanying drawings.

DETAILED DESCRIPTION OF THE PREFERRED EMBODIMENTS OF THE INVENTION

A first embodiment of the invention will be described with reference to FIGS. 1 to 28.

Figure 2:
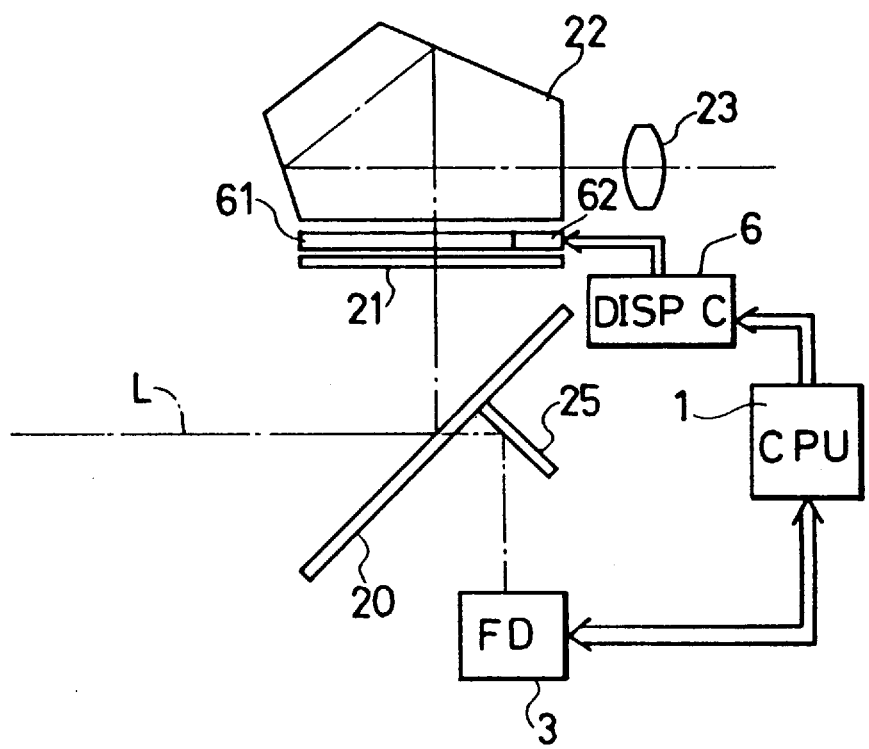
FIG. 2 is a diagram showing an essential construction of the camera.

FIG. 2 is a diagram showing a main construction of a camera incorporating the invention as a first embodiment.

An image of a subject is introduced to a viewfinder mirror 20 along an optical axis L from an unillustrated taking lens. The viewfinder mirror 20 is opaque except a center portion thereof. The center portion of the mirror 20 is semitransparent such that only the subject image having an amount of light required for an automatic focusing control (hereinafter referred to as AF control) transmits therethrough. A focusing plate 21 is arranged in such a position to make sharpest a subject image introduced through the unillustrated taking lens unit disposed on the optical axis at the left side of the drawing in FIG. 2. On the focusing plate 21 is obtained the image as the one to be photographed. The subject image obtained on the focusing plate 21 is formed on an eyepiece lens 23 through a pentagonal prism 22. A camera operator can view within a picture frame on a viewfinder screen the same image as the one to be photographed by looking through the eyepiece lens 23.

Between the focusing plate 21 and the pentagonal prism 22 are disposed display units 61, 62 such as a transparent liquid crystal display panel. The display units 61, 62 are drivingly controlled by a display control circuit (DISPC circuit) 6. By controlling the display units 61. 62, information concerning the image to be photographed (hereinafter referred to as image information) is displayed with the image to be photographed on the viewfinder screen in predetermined positions by the use of specified image indicators to be described with reference to FIG. 4. The image information is displayed with the image to be photographed on the viewfinder screen in a superimposing manner.

On the other hand, the subject image introduced to a sub-mirror 25 from the viewfinder mirror 20 is reflected downward by the sub-mirror 25 to a focus detecting (FD) circuit 3 for detecting a focus condition. The FD circuit 3 includes an optical system required for the AF control, a photodetector such as a CCD, and a signal output circuit. Designated at 1 is a microprocessor (hereinafter referred to as CPU). The CPU 1 sends necessary data to the DISPC circuit 6 to control a display manner, executes an AF calculation in accordance with an output signal of the FD circuit 3, and controls the sequence of operations of the entire camera.

Figure 3:
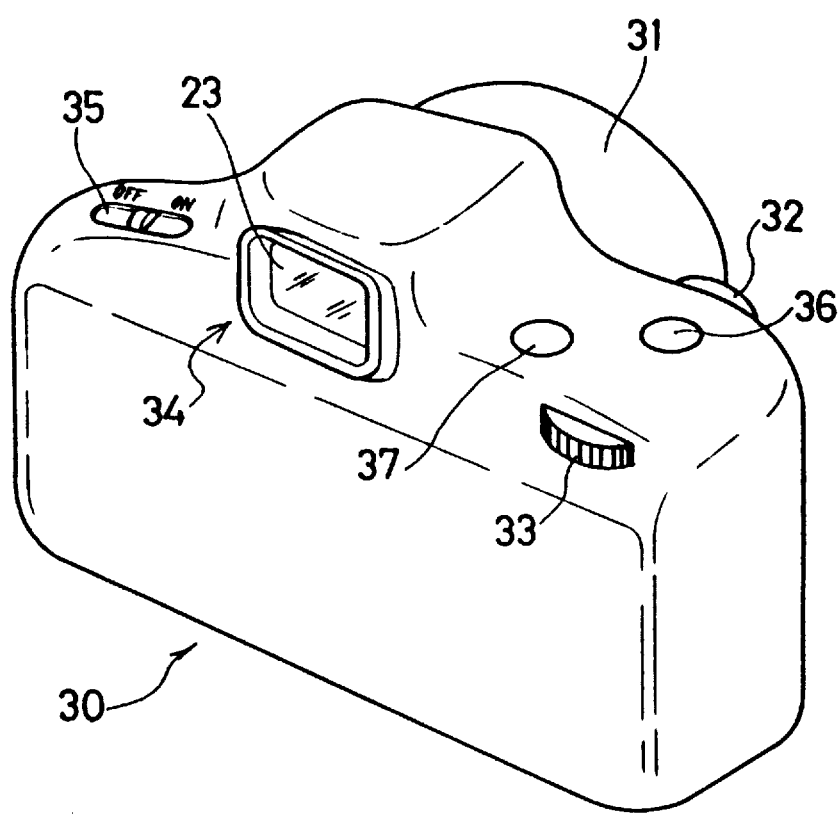
FIG. 3 is a perspective view of the camera viewed from behind.

FIG. 3 is a perspective view showing a camera 30 viewed obliquely from behind.

A taking lens unit 31 is mounted to a front portion of the camera 30. The taking lens unit 31 may be an interchangeable lens. At an upper lateral end of the front portion of the camera 30 is provided a shutter speed setting member 32 for increasing or decreasing a shutter speed. An aperture value setting member 33 is provided at an upper lateral end of a rear portion of the camera 30. The aperture value setting member 33 is adapted for increasing or decreasing an aperture value. These members 32, 33 are respectively designed to increase the shutter speed and the aperture value by predetermined amounts (e.g., 0.5 in APEX value) when turned to one direction, and decrease them by predetermined amounts (e.g., 0.5 in APEX value) when turned to the other direction.

A viewfinder unit 34 is provided in a specified position of the rear portion of the camera 30. The viewfinder unit 34 includes the eyepiece lens 23 through which the camera operator is allowed to view the image to be photographed and specified image information together in the superimposing manner. Further, a main switch 35 for powering on/off the camera 30 is provided on a left side of an upper face of the camera 30. At a specified position of the other (right) side is provided a release button 36. The camera 30 is provided with a plurality of settable exposure modes. In proximity to the release button 36 is disposed an exposure mode changeover switch 37 for selectively setting a desired exposure mode. The exposure modes are cyclically changed in a specified order each time the exposure mode changeover switch 37 is depressed.

Figure 4:
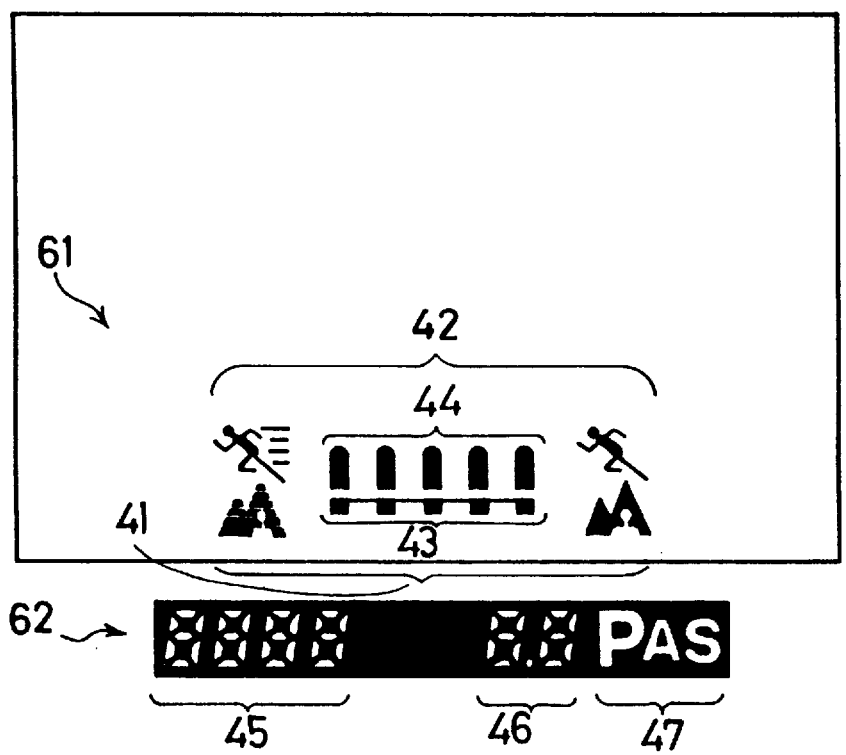
FIG. 4 is a diagram showing all the indications displayed on a viewfinder screen.

FIG. 4 is a diagram showing indication of the image information displayed on the viewfinder screen inside and outside the picture frame by the display units 61, 62. The indications made by the display unit 61 is superimposingly displayed in specified positions within the picture frame. whereas those made by the display unit 62 is displayed in specified positions outside the picture frame. In this embodiment, these indications are displayed in a lower portion of the picture frame and below the picture frame respectively.

In the display unit 61, designated at 41 is a background unsharpness level indicator, and at 42 an action level indicator. The left and right pictorial marks of the background unsharpness level indicator 41 represent states of a final picture when a background unsharpness level is set at maximum and at minimum respectively. The left and right pictorial marks of the action level indicator 42 represent states of a final picture when an action level is set at maximum and minimum respectively. Designated at 43 is a background unsharpness/action level coordinate representing background unsharpness levels and action levels. Designated at 44 are a plurality of indices in correspondence with the background unsharpness/action level coordinate 43. The indices 44 are adapted for indicating the set background unsharpness or action level. Only the index corresponding to the set level is lighted, whereby the set background unsharpness or action level is displayed. As shown in FIG. 4, since the level coordinate 43 has five levels, it is possible to indicate the background unsharpness or action level in five stages by the use of indices 44. However, it is sufficient to provide at least two levels of background unsharpness and action. In the indicator 41, the background unsharpness level moves to the right side (to the minimum level) as the aperture value setting member 33 is turned right (in the drawing of FIG. 3) while moving to the left side (to the maximum level) as the member 33 is turned left. Similarly, in the indicator 42, the action level moves to the right side (to the minimum level) as the shutter speed setting member 32 is turned in a clockwise direction (in the drawing of FIG. 3) while moving to the left side (to the maximum level) as the member 32 is turned in a counterclockwise direction.

The background unsharpness of a subject image represents unsharpness of a background subject image relative to a main subject image in the final picture, i.e., how much the main subject image will stand out of the background subject image in the final picture. The right pictorial mark in the background unsharpness level indicator 41 represents a case where the background unsharpness of the subject image is at minimum while the left pictorial mark representing a case where it is at maximum. The active state of the image represents how active or how still the main subject image looks in the final picture. The right pictorial mark in the action level indicator 42 represents a case where the active state of the main subject image is at minimum, i.e., the main subject image looks still in the final picture while the left pictorial mark representing a case where it is at maximum. Thus, visual effects are superimposingly displayed on the viewfinder screen where the image to be photographed is displayed. Accordingly, the operator can confirm the image to be photographed at the same time visually predicting what the final picture looks like, and thereby improving operability of the camera.

In the display unit 62, designated at 45 is a shutter speed indicator, at 46 an aperture indicator. Each of the shutter speed and aperture indicators includes a specified number of digits. Designated at 47 is an exposure mode indicator including three display segments, the display segments displaying "P," "A," and "S." When the exposure mode is set to a normal program mode (P-mode), "P" is displayed. When the exposure mode is set to PA-mode, "PA" is displayed. When the exposure mode is set to PS-mode, "PS" is displayed. When the exposure mode is set to an aperture priority mode (A-mode), "A" is displayed. When the exposure mode is set to a shutter speed priority mode (S-mode), "S" is displayed. When the exposure mode is set to a manual mode (M-mode), no indication is made on the exposure mode indicator 47.

Here, the respective exposure mode will be described.

P-mode: a mode wherein an aperture value AV and a shutter speed TV are calculated based on an exposure value in accordance with a preset program line.

A-mode: a mode wherein an aperture value is manually set and a shutter speed TV is obtained by subtracting the set aperture value from an exposure value.

S-mode: a mode wherein a shutter speed is manually set and an aperture value AV is obtained by subtracting the set shutter speed TV from an exposure value.

M-mode: a mode wherein an aperture value AV and a shutter speed TV are both manually set.

Further, in this embodiment, a combination of P-mode and A- or S-mode is adopted as an exposure mode. Specifically, there are adopted PA-mode and PS-mode which are generically called as PAS-mode. The PA-mode, PS-mode are submodes of the P-mode.

PA-mode: a mode wherein a new shutter speed TV is obtained when an aperture value AV is manually changed from a photographing condition (a combination of AV and TV) determined by a program line. The new shutter speed TV, corresponding to the changed aperture value AV, is obtained based on brightness of a subject when the aperture value is changed. Even if the brightness changes thereafter, only the shutter speed TV is changed.

PS-mode: a mode wherein a new aperture value AV is obtained when a shutter speed TV is manually changed from a photographing condition (a combination of AV and TV) determined by a program line. The new aperture value AV, corresponding to the changed shutter speed TV, is obtained based on brightness of a subject when the shutter speed is changed. Even if the brightness changes thereafter, only the aperture value AV is changed.

Provision of the PA-mode and PS-mode enables the operator to easily and readily change the exposure mode to the A-mode or S-mode from the P-mode only by manipulating the operable members 32, 33 while viewing the subject through the viewfinder unit 34.

Figure 1:
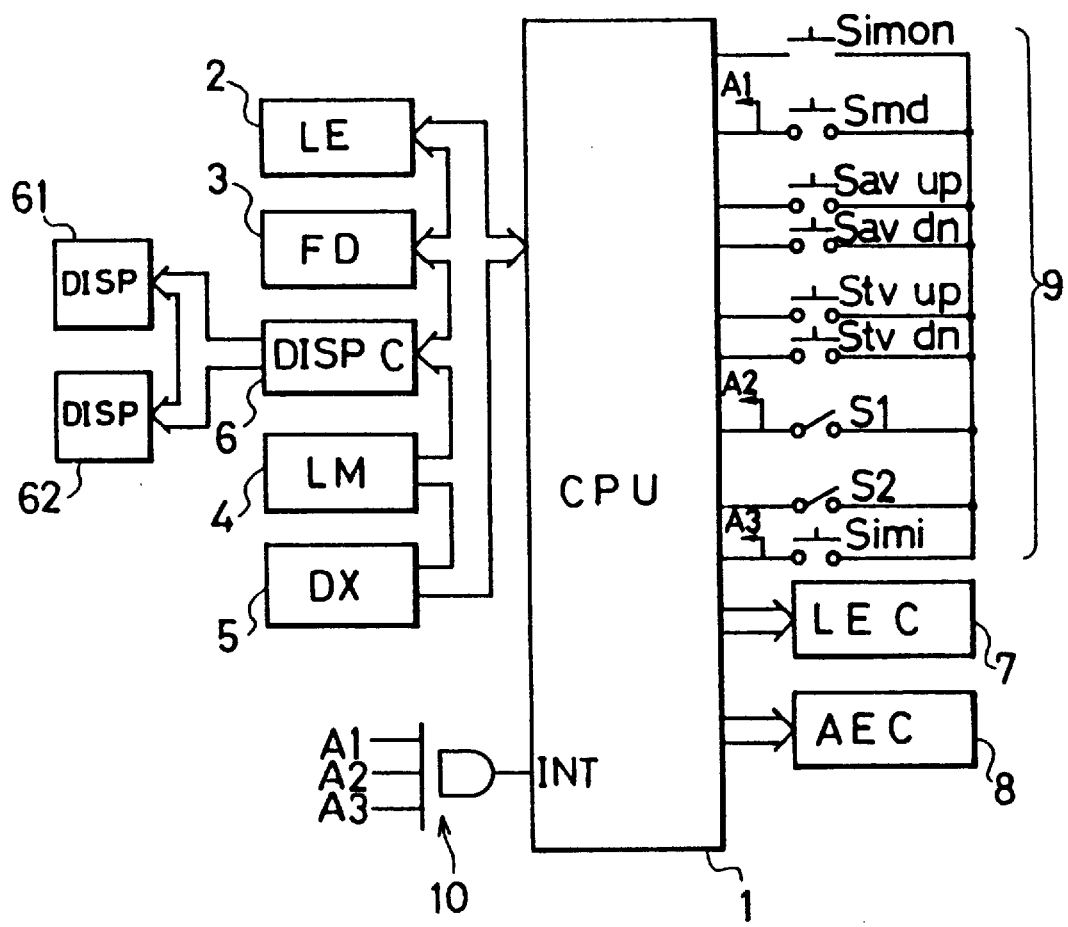
FIG. 1 is a block diagram showing a control system incorporated into a first camera embodying the invention.

FIG. 1 is a block diagram showing a control system of the first camera embodying the invention.

The CPU 1, being adapted for centrally controlling the sequence of the entire operations of the camera 30, executes necessary controls to be described later in accordance with signals from individual elements of the camera 30. Further, the CPU 1 uses an unillustrated internal timer to controllably set proper timings for some setting operations in a manner to be described below. In addition, the CPU 1 uses various flags to control the state of the camera.

Designated at 2 is a lens circuit (LE circuit) provided internally in the taking lens unit 31 and consisting essentially of a read only memory (ROM) or the like in which all the necessary lens data are stored. The lens data include a fully open aperture value AV0, a focal length fl, an amount by which the lens is moved along the optical axis L in response to a lens drive signal from the CPU 1 (a reference lens movement amount), etc. The LE circuit 2 is electrically connected to the CPU 1 with the taking lens unit 31 mounted to the camera 30. Designated at 3 is a focus detecting circuit (FD circuit) which executes an AF control to detect a focus condition of the taking lens unit 31, and sends to the CPU 1 a signal representative of a subject distance in accordance with the detection result. The FD circuit 3 executes the AF control using a phase difference detecting technique. More specifically, the subject image introduced to the FD circuit 3 by way of the sub-mirror 25 is separated by an unillustrated condenser lens into two images, which are transferred in two directions to a base section and a reference section in array each. The CPU 1 reads signals representing subject images introduced to the base and reference sections, and calculates correlation of the two signals to calculate a defocus amount of the taking lens unit 31.

Designated at 4 is a light measuring circuit (LM circuit) for measuring brightness of the subject and producing brightness data. The produced brightness data is sent to the CPU 1 in which an exposure value is calculated. Designated at 5 is a film sensitivity circuit (DX circuit) for reading sensitivity data of a film provided in an appropriate position of a cartridge and sending the read film sensitivity data to the CPU 1.

The DISPC circuit 6 displays on/off the respective image indicators on the viewfinder screen in accordance with an instruction from the CPU 1 and display data. The DISPC circuit 6 controls the display units 61, 62 individually. Designated at 7 is a lens control circuit (LEC circuit) 7 for outputting a train of a specified number of pulses based on the defocus amount obtained as a result of the AF control and the reference lens movement amount so as to drive the taking lens unit 31 to attain an in-focus condition. Designated at 8 is an automatic exposure control circuit (AEC circuit) for executing an exposure control in accordance with photographing conditions set based on the exposure value obtained in the LM circuit 4 or manually set shutter speed TV and aperture value AV.

Switches 9 are adapted for executing the photographing operation, setting the exposure mode, setting the photographing conditions, displaying the image indicators, and the like. Description on the individual switches will be made below. An AND circuit 10, being connected to an interrupt signal input port (INT input port) of the CPU 1, is designed to send an interrupt signal upon receipt of any of signals A1, A2, A3. The signals A1 to A3 are sent to the AND circuit 10 when switches Smd, S1, Simi are turned on respectively.

Here, each of the switches 9 will be described.

Simon: A switch Simon is a switch for clearing a display made by the display unit 61 on the viewfinder screen when in the ON state while turning it on when in OFF state.

Smd: A switch Smd serves as an exposure mode changeover switch. The exposure mode is cyclically changed from P-mode to S-mode, from S-mode to A-mode, from A-mode to M-mode, and from M-mode back to P-mode.

Savup: A switch Savup serves as an aperture value up-switch for increasing the aperture value AV by a predetermined amount each time it is operated. In this embodiment, in the case where the preceding exposure mode is set at P-mode or PS-mode, the exposure mode is changed to PA-mode when the switch Savup is first operated.

Savdn: A switch Savdn serves as an aperture value down-switch for decreasing the aperture value AV by a predetermined amount each time it is operated. In this embodiment, in the case where the preceding exposure mode is set at P-mode or PS-mode, the exposure mode is changed to PA-mode when the switch Savdn is first operated.

Stvup: A switch Stvup serves as a shutter speed up-switch for increasing the shutter speed TV by a predetermined amount each time it is operated. In this embodiment, in the case where the preceding exposure mode is set at P-mode or PA-mode, the exposure mode is changed to PS-mode when the switch Stvup is first operated.

Stvdn: A switch Stvdn serves as a shutter speed down-switch for decreasing the shutter speed TV by a predetermined amount each time it is operated. In this embodiment, in the case where the preceding exposure mode is set at P-mode or PA-mode, the exposure mode is changed to PS-mode when the switch Stvdn is first operated.

S1: A switch S1 is turned on when the release button 36 is pressed halfway. When the switch S1 is in the ON state, the AF control and light measurement are executed.

S2: A switch S2 is turned on when the release button 36 is pressed all the way after being pressed halfway. When the switch S2 is set in the ON state, the exposure operation is started.

Simi: A switch Simi serves as a display mode changeover switch. A display mode according to which the image indicators (41, 42) within the picture frame on the viewfinder screen are displayed on/off is cyclically changed from one mode to another each time the switch Simi is pressed. Display modes include the following four modes:

Display mode I: No indicator is displayed in all the exposure modes.

Display mode II: No indicator is displayed in M-mode.

Display mode III: No indicator is displayed in A-, S-, M-modes.

Display mode IV: All the indicators are displayed in all the exposure modes.

Figure 5:
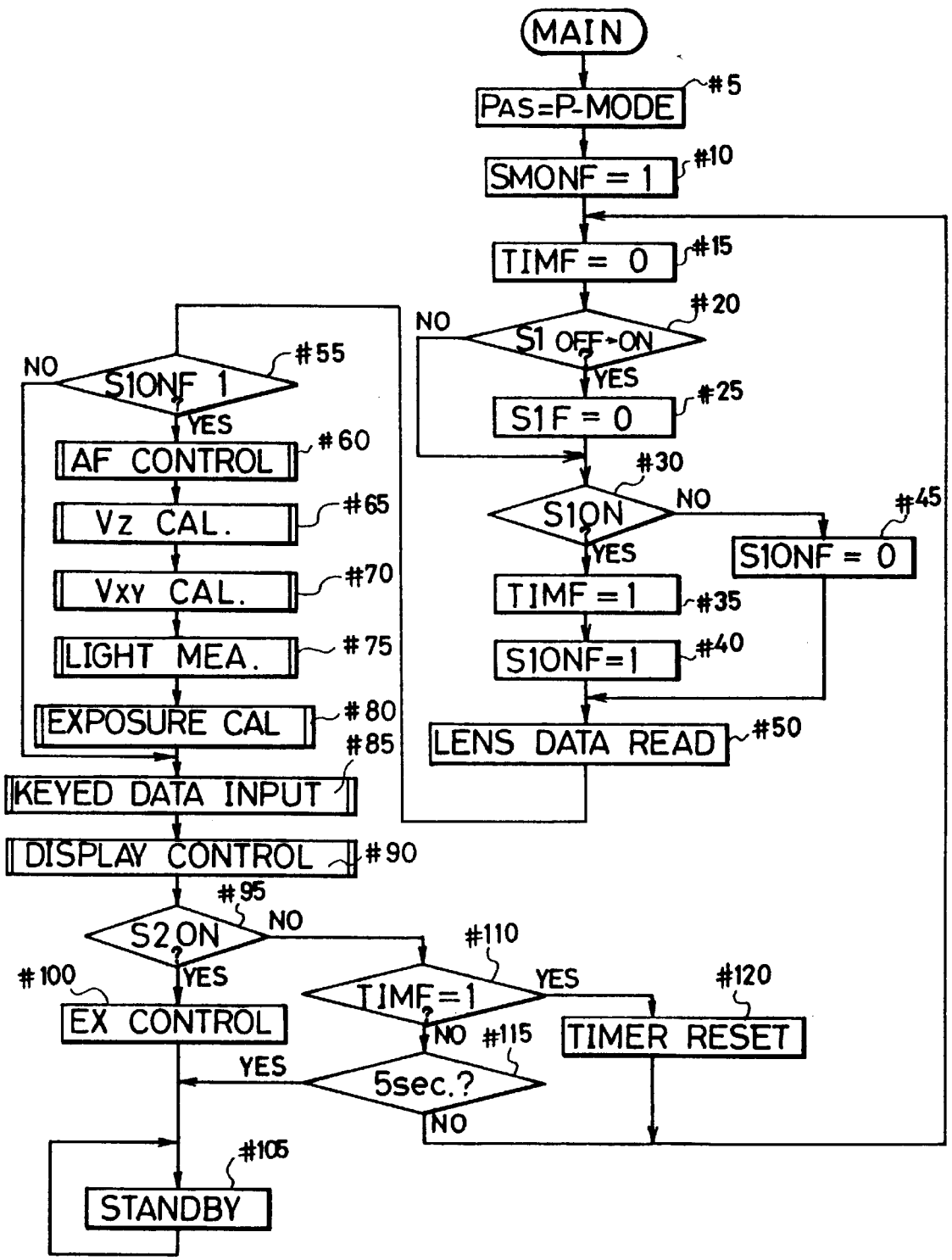
FIG. 5 is a flow chart showing a "Main Routine" in which sequence operations of the camera are executed.

Next, there will be described a "Main Routine" of the camera with reference to FIG. 5.

The camera enters the "Main Routine" when any of the followings occurs: 1) The release button 36 is pressed halfway, i.e., the switch S1 is turned on; 2) The exposure mode changeover button 37 is pressed, i.e., the switch Smd is turned on; and 3) The switch Simi is turned on.

Firstly, the PAS-mode is reset to the P-mode in Step #5, and a flag SIM0NF is set to 1 in Step #10. The flag SIM0NF is indicative of whether or not the image indicator is to be displayed within the picture frame on the viewfinder screen.

The image indicator is to be displayed when the flag SIM0NF is set to 1, whereas the image indicator is not to be displayed when the flag SIM0NF is set to 0. Subsequently, a timer flag TIMF is reset to 0 in Step #15, and it is discriminated whether the state of the switch S1 has been just changed from OFF to ON in Step #20. The timer flag TIMF is indicative of the operating state of a timer for measuring a power retention time. The timer is in an operative state when the flag TIMF is set to 0 while being in an inoperative state when the flag TIMF is set to 1. If the state of the switch S1 has been just changed from OFF to ON (YES in Step #20), a flag S1F is reset to 0 in Step #25. On the other hand, unless the state of the switch S1 has been just changed from OFF to ON (NO in Step #20), this routine proceeds directly to Step #30 since the flag S1F is already set to 0. In Step #30, it is discriminated whether the switch S1 is in the ON state. If the switch S1 is in the ON state (YES in Step #30), the timer flag TIMP is set to 1 in Step #35 and a flag S10NF is set to 1 in Step #40. The flag S10NF is indicative of the state of the switch S1. The flag S10NF is set at 1 when the switch S1 is in the ON state while being set at 0 when the switch S1 is in the OFF state. If the switch S1 is in the OFF state (NO in Step #30), this routine proceeds to Step #50 after resetting the flag S10NF to 0 in Step #45. In Step #50, CPU 1 reads from the LE circuit 2 the various lens data inherent in the taking lens unit 31 in use.

Upon completion of reading of the lens data from the LE circuit 2, it is discriminated whether the flag S10NF is set to 1 in Step #55. If the flag S10NF is set to 1 (YES in Step #55), an "AF Control Routine" is executed in Step #60. Then, a subject speed Vz and a blurring speed Vxy are calculated in Steps #65, #70 respectively. The subject speed Vz is a speed at which the subject moves along the optical axis L while the blurring speed Vxy is a speed at which the subject moves in a plane normal to the optical axis L.

Figure 6:
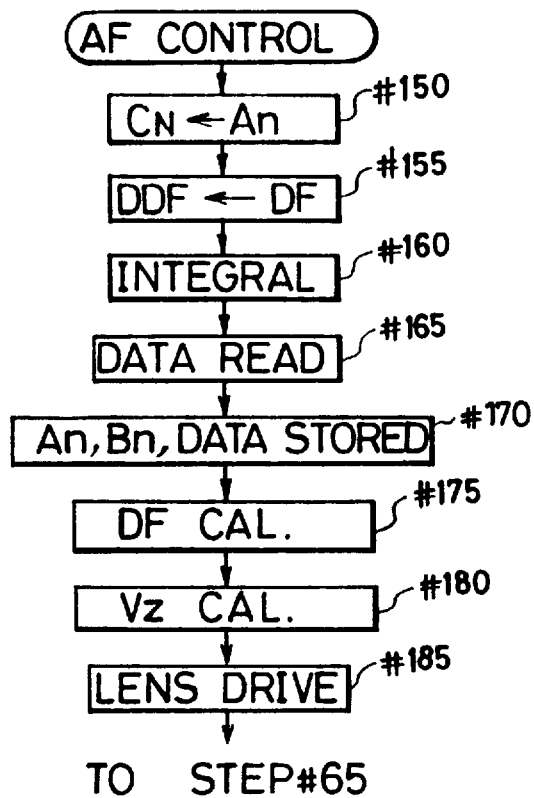
FIG. 6 is a flow chart showing an "AF Control Routine"

FIG. 6 is a flow chart showing the "AF Control Routine."

Data An obtained in the base section when the last AF control is executed and the defocus amount DF are stored temporarily as data Cn and data DDF in appropriate storage means in the CPU 1 in Steps #150 and #155 respectively. Then, the subject image is introduced to the base and reference sections so as to start the present AF control in Step #160. Data An, Bn representing the amount of light the base and reference sections received from the subject image within a predetermined integral time are temporarily stored in a buffer memory, thereby completing the reading of the data for measuring the subject distance in Step #165. Then, the read data are stored in the unillustrated storage means in the CPU 1 in Step #170. The CPU 1 calculates the correlation of the data An, Bn in terms of the phase difference to obtain the defocus amount DF in Step #175, and calculates the subject speed Vz in Step #180. In Step #185, the CPU 1 sends a signal representative of the obtained defocus amount DF to the LEC circuit 7 which in turn drives the taking lens unit 31 to attain the in-focus condition. Then, this subroutine returns to Step #65.

Figure 7:
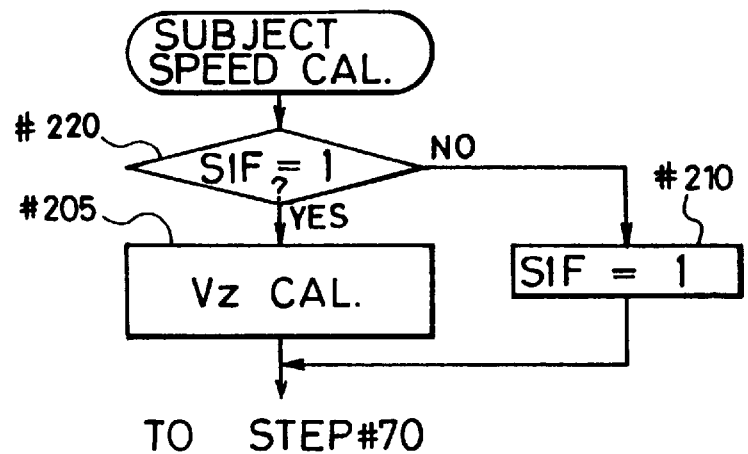
FIG. 7 is a flow chart showing a "Subject Speed Calculation Routine"

FIG. 7 is a flow chart showing a "Subject Speed Calculation Routine."

Firstly, it is discriminated whether the flag S1F is set to 1 in Step #200. If the flag S1F is set to 1 (YES in Step #200), it means that the AF control has been already executed at least twice and therefore the defocus amount DF has been already read. Accordingly, the subject speed VZ is calculated in Step #205. On the other hand, if the flag S1F is set to 0 (NO in Step #200), this subroutine returns to Step #70 to wait for the next AF control after setting the flag S1F to 1 in Step #210. The subject speed VZ is calculated in accordance with the defocus amount DF obtained in the present AF control, defocus amount DDF obtained in the last AF control, lens drive amount based on the last AF control, and time interval between two consecutive AF controls.

Figure 8:
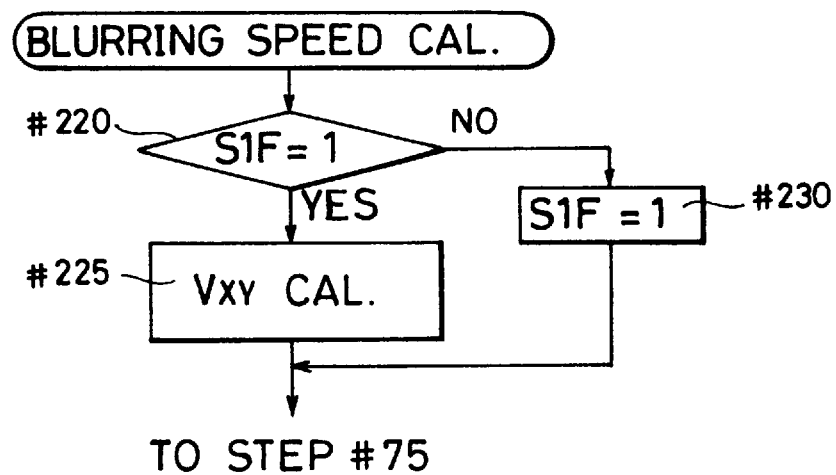
FIG. 8 is a flow chart showing a "Blurring Speed Calculation Routine"

FIG. 8 is a flow chart showing a "Blurring Speed Calculation Routine."

This subroutine is basically similar to the one shown in FIG. 7. Specifically, it is discriminated whether the flag S1F is set to 1 in Step #220. If the flag S1F is set to 1 (YES in Step #220), it means that the AF control has been already executed at least twice and therefore the data Cn has been already read out of the base section. Accordingly, the blurring speed Vxy is calculated in Step #225. On the other hand, if the flag S1F is set to 0 (NO in Step #220), this subroutine returns to Step #75 to wait for the next AF control after setting the flag S1F to 1 in Step #230. The blurring speed Vxy is calculated in accordance with the data An obtained in the present AF control, data Cn obtained in the last AF control, and time interval between two consecutive AF controls.

After obtaining the subject distance, subject speed Vz, blurring speed Vxy, a "Light Measurement Routine" is executed to calculate brightness BV0 of the subject in Step #75. Then, an "Exposure Calculation Routine" is executed in Step #80 based on the obtained brightness BV0 of the subject and film sensitivity SV. It will be noted that the main routine proceeds directly to Step #85 if it is discriminated that the flag S10NF is set to 0 in Step #55.

Figure 9:
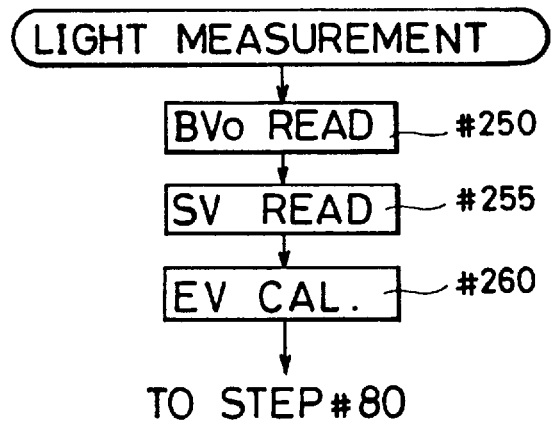
FIG. 9 is a flow chart showing a "Light Measurement Routine"
Figure 10:
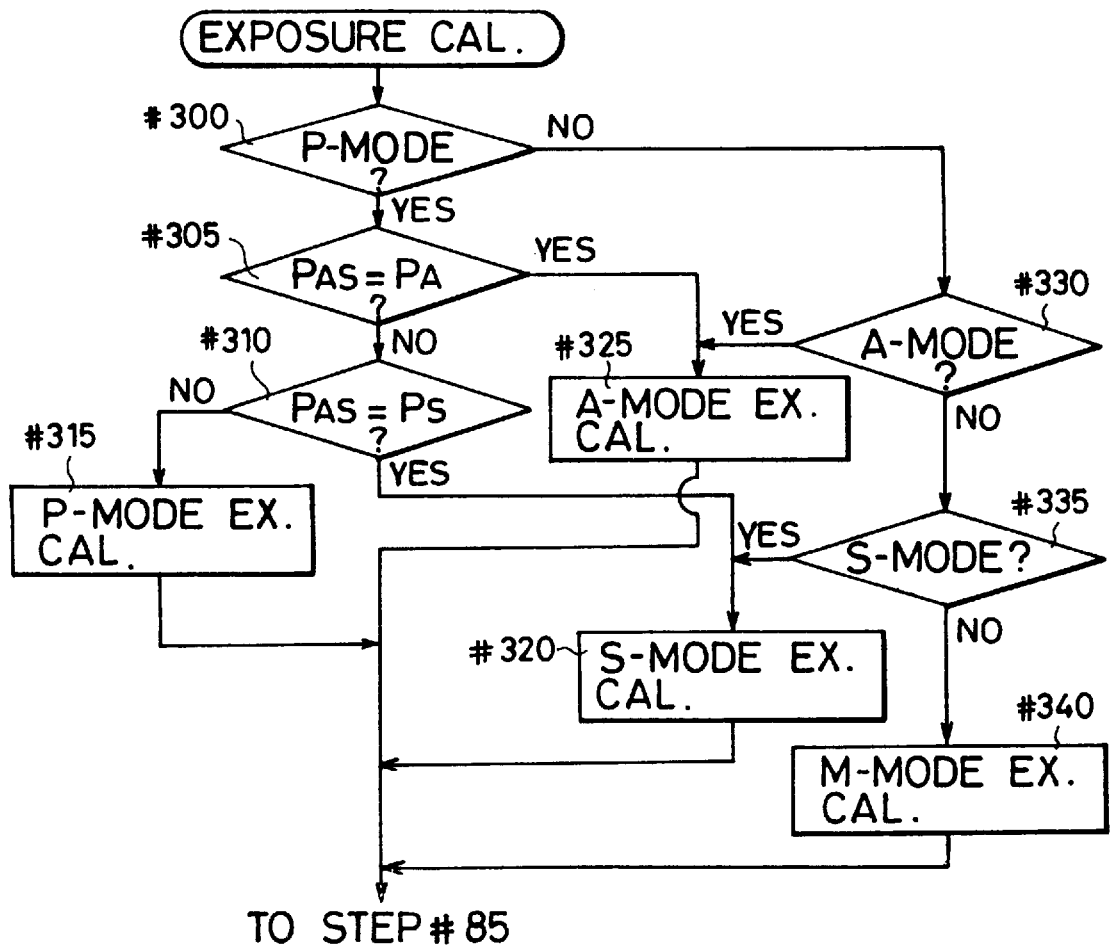
FIG. 10 is a flow chart showing an "Exposure Calculation Routine"

FIGS. 9, 10 are flow charts showing the "Light Measurement Routine" and "Exposure Calculation Routine" respectively.

In the "Light Measurement Routine," the CPU 1 reads the brightness BVO from the LM circuit 4 in Step #250, and reads the film sensitivity SV from the DX circuit 5 in Step #255. In Step #260, the CPU 1 reads the fully open aperture value AV0 from the LE circuit 2 and calculate an exposure value EV based on the brightness BV0, film sensitivity SV, and fully open aperture value AV0 using the following equation:

$$EV=BV0+AV0+SV$$

Then, this subroutine returns to Step #80.

In the "Exposure Calculation Routine," it is discriminated whether the P-mode is currently set as exposure mode in Step #300. If the P-mode is currently set (YES in Step #300), it is discriminated whether the PA-mode is currently set as exposure mode in Step #305. If the PA-mode is not currently set (NO in Step #305), it is discriminated whether the PS-mode is currently set as exposure mode in Step #310. If the PS-mode is not currently set (NO in Step #310), it is determined that the P-mode is currently set as exposure mode and a P-mode exposure calculation is carried out in Step #315. More specifically, the aperture value AV and shutter speed TV, which serve as photographing conditions, are automatically set in accordance with an unillustrated program line based on the obtained exposure value EV. Then, this subroutine returns to Step #85. If the PA-mode is currently set (YES in Step #305), an A-mode exposure calculation is carried out in Step #325. More specifically, the shutter speed TV is calculated based on the currently set aperture value AV and the obtained exposure value EV. Then, this subroutine returns to Step #85.

If the PS-mode is currently set (YES in Step #310), an S-mode exposure calculation is carried out in Step #320. More specifically, the aperture value AV is calculated based on the currently set shutter speed TV and the obtained exposure value EV. Then, this subroutine returns to Step #85.

On the other hand, if the currently set exposure mode is not P-mode (NO in Step #300), it is discriminated whether the A-mode is currently set as exposure mode in Step #330. If the A-mode is currently set (YES in Step #330), this subroutine proceeds to Step #325 to carry out the A-mode exposure calculation. If the A-mode is not currently set (NO in Step #330), it is discriminated whether the S-mode is currently set as exposure mode in Step #335. If the S-mode is currently set (YES in Step #335), this subroutine proceeds to Step #320 to carry out the S-mode exposure calculation. If the S-mode is not currently set (NO in Step #335), it means that the M-mode is currently set as exposure mode. Accordingly, this subroutine proceeds to Step #340 to carry out an M-mode exposure calculation. More specifically, manually adjusted shutter speed TV and aperture value AV are set. Then, this subroutine returns to Step #85.

Referring back to FIG. 5, in Step #85, a "Keyed Data Input Routine" is executed to change and set the photographing conditions in accordance with operating states of the switches 9, i.e., input states of keyed data. In Step #90, a "Display Control Routine" is executed to control the display of the image indicators within the picture frame on the viewfinder screen according to the operating states of the switches 9.

Figure 11:
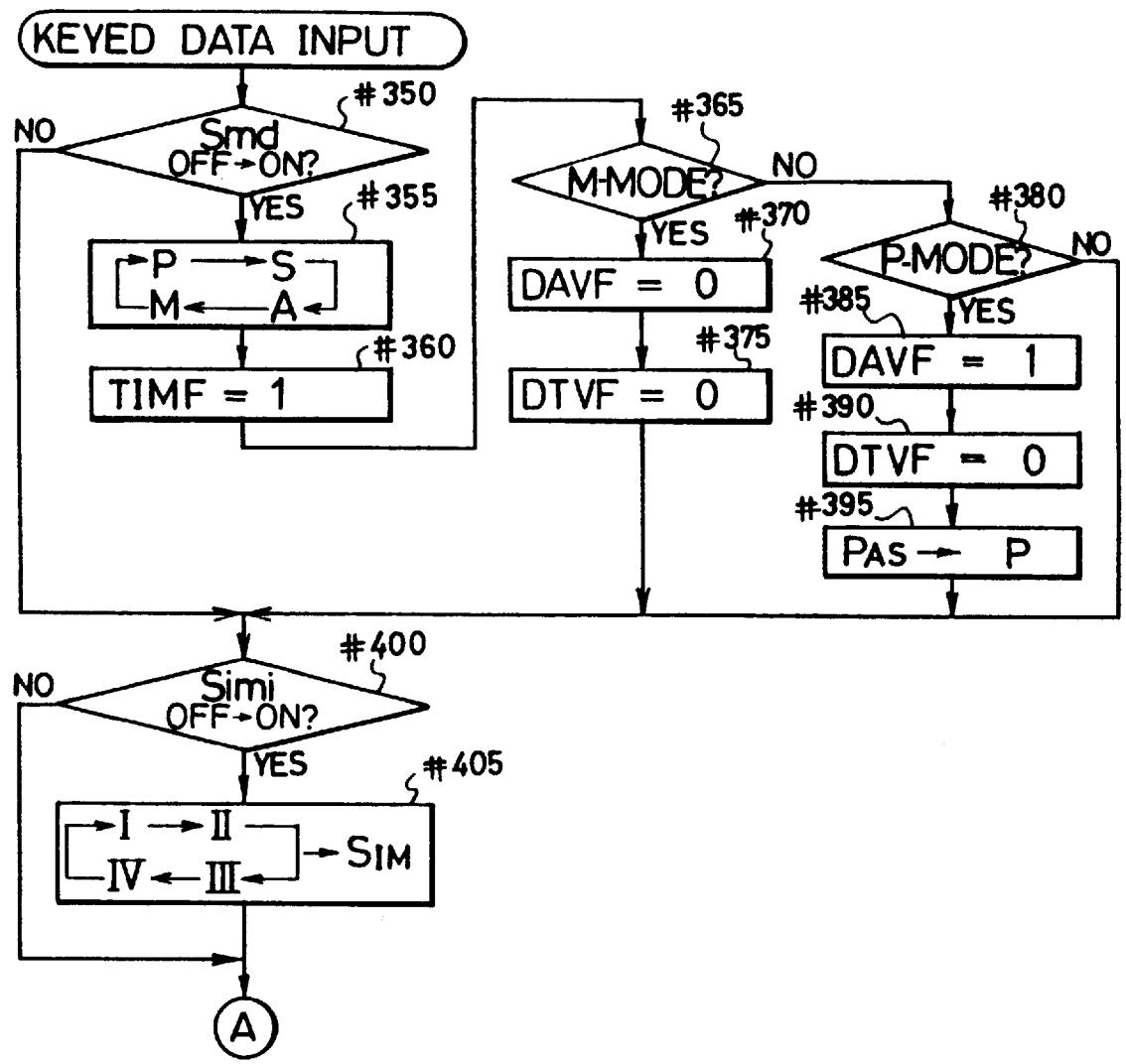
FIGS. 11, 12, and 13 are flow charts showing a "Keyed Data Input Routine"
Figure 12:
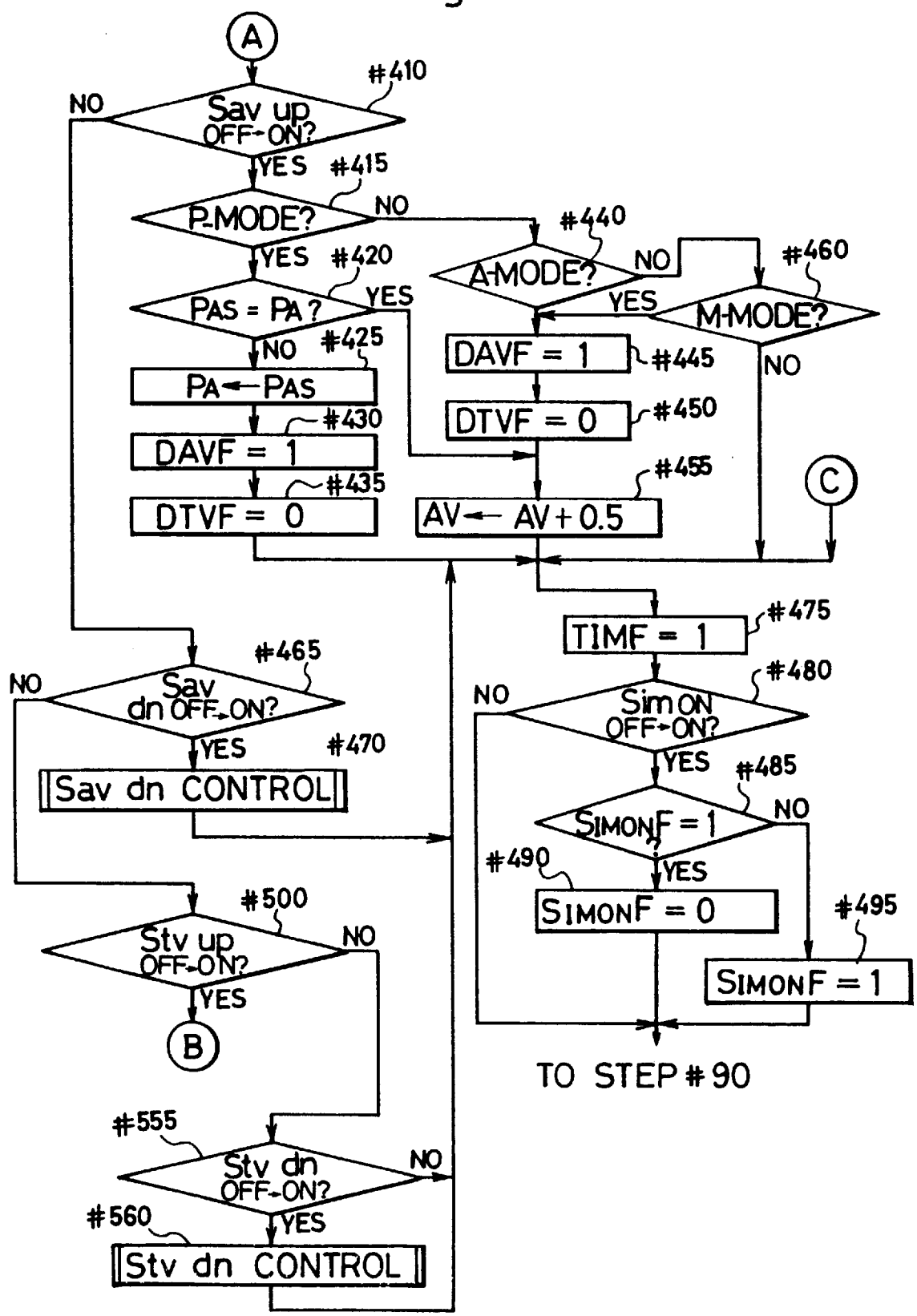
Figure 13:
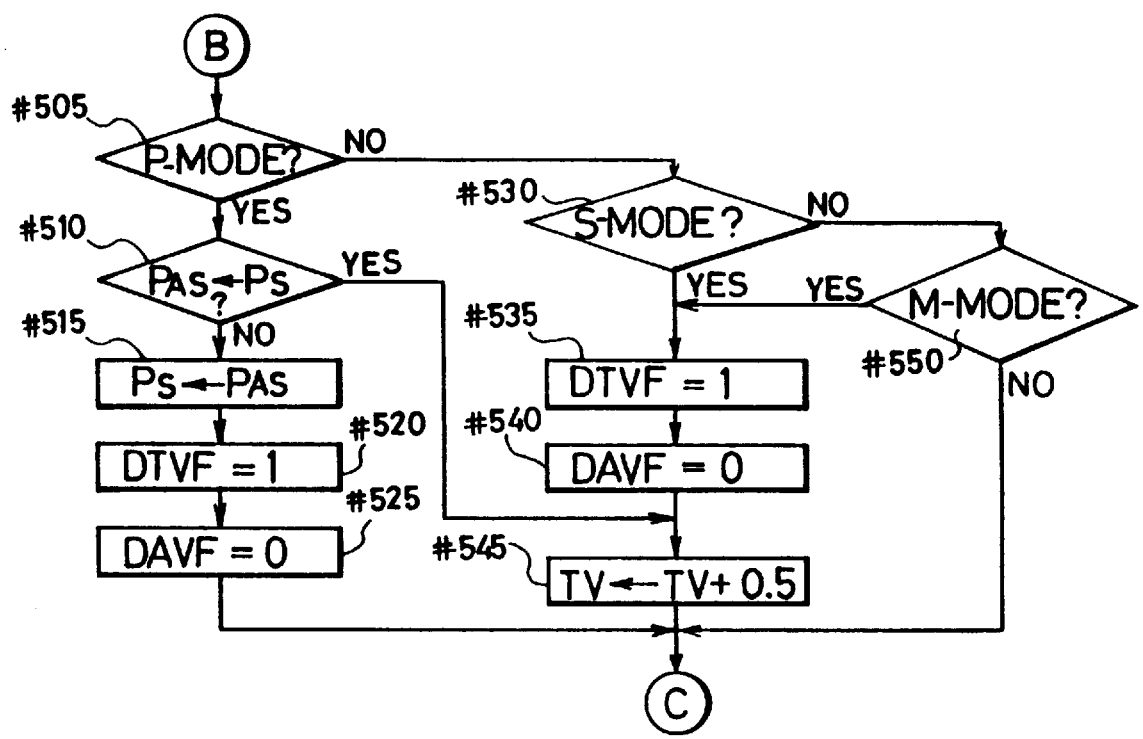

FIGS. 11 to 13 are flow charts showing the "Keyed Data Input Routine." In this subroutine, firstly, it is discriminated whether the exposure mode changeover switch Smd has been just changed from OFF to ON in Step #350. If the state of the switch Smd has been just changed from OFF to ON (YES in Step #350), this subroutine proceeds to Step #355. Unless otherwise (NO in Step #350), this subroutine proceeds to Step #400). In Step #355, the exposure mode is changed from the currently set mode to the next one. As mentioned above, the exposure mode is changed in the following order: P-mode→S-mode→A-mode→M-mode→P-mode. Then, the timer flag TIMF is set to 1 in Step #360.

Subsequently, it is discriminated whether the exposure mode is changed to M-mode in Step #365. If the exposure mode is changed to M-mode (YES in Step #365). flags DAVF. DTVF are reset to 0 in Steps #370, #375 respectively, and this subroutine proceeds to Step #400. The flags DAVF, DTVF are indicative of whether the background unsharpness level indicator 41 and action level indicator 42 are to be displayed within the picture frame on the viewfinder screen. The background unsharpness level indicator 41 is not to be displayed when the flag DAVF is set to 0, whereas it is to be displayed when the flag DAVF is set to 1. Similarly, the action level indicator 42 is not to be displayed when the flag DTVF is set to 0, whereas it is to be displayed when the flag DTVF is set to 1. The background unsharpness and action level indicators 41, 42 are not to be displayed when the M-mode is set as exposure mode for the following reason; it cannot be determined which indicator should be displayed when the exposure mode is changed to M-mode from the other mode. In this case, it may be appropriate to independently provide a member for designating which indicator should be displayed. Alternatively, both indicators may be displayed in the case where it is possible to display the background unsharpness level and action level individually.

If, on the other hand, the exposure mode is changed to the mode other than M-mode (NO in step 365), it is discriminated whether the exposure mode is changed to P-mode in Step #380. If the exposure mode is changed to P-mode (YES in Step #380), the flags DAVF, DTVF are set to 1, 0 in Steps #385, #390 respectively. In the case where the PA-, or PS-mode is currently set, the exposure mode is reset to the P-mode in Step #395 and this subroutine proceeds to Step #400. If the A-, or S-mode is currently set as exposure mode (NO in Steps #365, #380), this subroutine proceeds directly to Step #400.

In Step #400, it is discriminated whether the state of the switch Simi has been just changed from OFF to ON. If the state of the switch Simi has been just changed from OFF to ON (YES in Step #400), the display mode is changed from the currently set mode to the next mode in the following order in Step #405: Display Mode I→Display Mode II→Display Mode III→Display Mode IV→Display Mode I. Unless the state of the switch Simi has been just changed from OFF to ON (NO in Step #400), this subroutine proceeds to Step #410.

In Step #410 and subsequent Steps, it is discriminated which exposure mode is currently set. Specifically, it is discriminated whether the state of the switch Savup has been just changed from OFF to ON in Step #410. If the state of the switch Savup has been just changed from OFF to ON (YES in Step #410), an aperture value up-control is executed which consists of operations of Steps #415 to #460. Specifically, it is discriminated whether the P-mode is currently set as exposure mode in Step #415. If the P-mode is currently set (YES in Step #415), it is further discriminated whether the PA-mode is currently set as exposure mode in Step #420. If it is discriminated the PA-mode is not currently set (NO in Step #420), it is determined that the switch Savup has been first operated and therefore the exposure mode is changed to PA-mode in Step #425. Then, this subroutine proceeds to Step #475 after setting the flags DAVF and DTVF to 1 and 0 respectively in Steps #430, #435. If the PA-mode is currently set (YES in Step #420), the aperture value AV is increased by 0.5 EV in Step #455.

If the P-mode is not currently set (NO in Step #415), it is discriminated whether the A-mode is currently set as exposure mode in Step #440. If the A-mode is currently set (YES in Step #440), the flags DAVF and DTVF are set to 1 and 0 respectively in Steps #445. #450. Subsequently, the aperture AV is increased by 0.5 EV in Step #455, and this subroutine proceeds to Step #475. If, on the other hand, the A-mode is not currently set (NO in Step #440), it is discriminated whether the M-mode is currently set as exposure mode in Step #460. If the M-mode is set (YES in Step #460), this subroutine proceeds to Step #475 after executing the aforementioned operations in Steps #445 to #455. If the M-mode is not currently set (NO in Step #460), this subroutine proceeds directly to Step #475.

Unless the state of the switch Savup has been just changed from OFF to ON (NO in Step #410), it is discriminated whether the state of the switch Savdn has been just changed from OFF to ON in Step #465. If the state of the switch Savdn has been just changed from OFF to ON (YES in Step #465), an aperture value down-control is executed in Step #470. The aperture value down-control consists mainly of operations similar to those executed in Steps #415 to #460 except Step #455. In the aperture value down-control, the aperture value is decreased by 0.5 EV rather than increased by 0.5 EV. Then, this subroutine proceeds to Step #475.

In Step #475, the timer flag TIMF is set to 1. Subsequently, it is discriminated whether the state of the switch Simon has been just changed OFF to ON in Step #480. Unless the state of the switch Simon has been just changed from OFF to ON (NO in Step #480), this subroutine returns to Step #90. On the other hand, if the state of the switch Simon has been just changed from OFF to ON (YES in Step #480), it is discriminated whether the flag SIM0NF is set to 0 in Step #485. If the flag SIM0NF is set to 1 (YES in Step #485), this subroutine returns to Step #90 after resetting the flag SIM0NF to 0 so as to clear the display of the image indicators in Step #490. On the other hand, if the flag SIM0NF is set to 0 (NO in Step #485), this subroutine returns to Step #90 after setting the flag SIM0NF to 1 so as to turn on the display of the image indicators in Step #495.

If neither of the switch Savup nor Savdn has been operated (NO in Steps #410, #465), it is discriminated whether the state of the switch Stvup has been changed from OFF to ON in Step #500. If the state of the switch Stvup has been changed from OFF to ON (YES in Step #500), a shutter speed up-control is executed which consists of operations of Steps #505 to #550. Specifically, it is discriminated whether the P-mode is currently set as exposure mode in Step #505. If the P-mode is currently set (YES in Step #505), it is further discriminated whether the PS-mode is currently set as exposure mode in Step #510. If the PS-mode is not currently set (NO in Step #510), it is determined that the switch Stvup has been first operated and therefore the exposure mode is changed to PS-mode in Step #515. Then, this subroutine proceeds to Step #475 after setting the flags DTVF and DAVF to 1 and 0 respectively in Steps #520, #525. If the PS-mode is currently set (YES in Step #510), the shutter speed TV is increased by 0.5 EV in Step #545.

If the P-mode is not currently set (NO in Step #505), it is discriminated whether the S-mode is currently set as exposure mode in Step #530. If the S-mode is currently set (YES in Step #530), the flags DTVF and DAVF are set to 1 and 0 respectively in Steps #535, #540. Subsequently, the shutter speed TV is increased by 0.5 EV in Step #545, and this subroutine proceeds to Step #475. If, on the other hand, the S-mode is not currently set (NO in Step #530), it is discriminated whether the M-mode is currently set as exposure mode in Step #550. If the M-mode is set (YES in Step #550), this subroutine proceeds to Step #475 after executing the aforementioned operations in Steps #535 to #545. If the M-mode is not currently set (NO in Step #550), this subroutine proceeds directly to Step #475.

Unless the state of the switch Stvup has not been just changed from OFF to ON (NO in Step #500), it is discriminated whether the state of the switch Stvdn has been just changed from OFF to ON in Step #555. If the state of the switch Stvdn has been just changed from OFF to ON (YES in Step #555), a shutter speed down-control is executed in Step #560. The shutter speed down-control consists mainly of operations same as those executed in Steps #505 to #550 except Step #545. In the shutter speed down-control, the shutter speed is decreased by 0.5 EV rather than increased by 0.5 EV. Then, this subroutine proceeds to Step #475.

Figure 14:
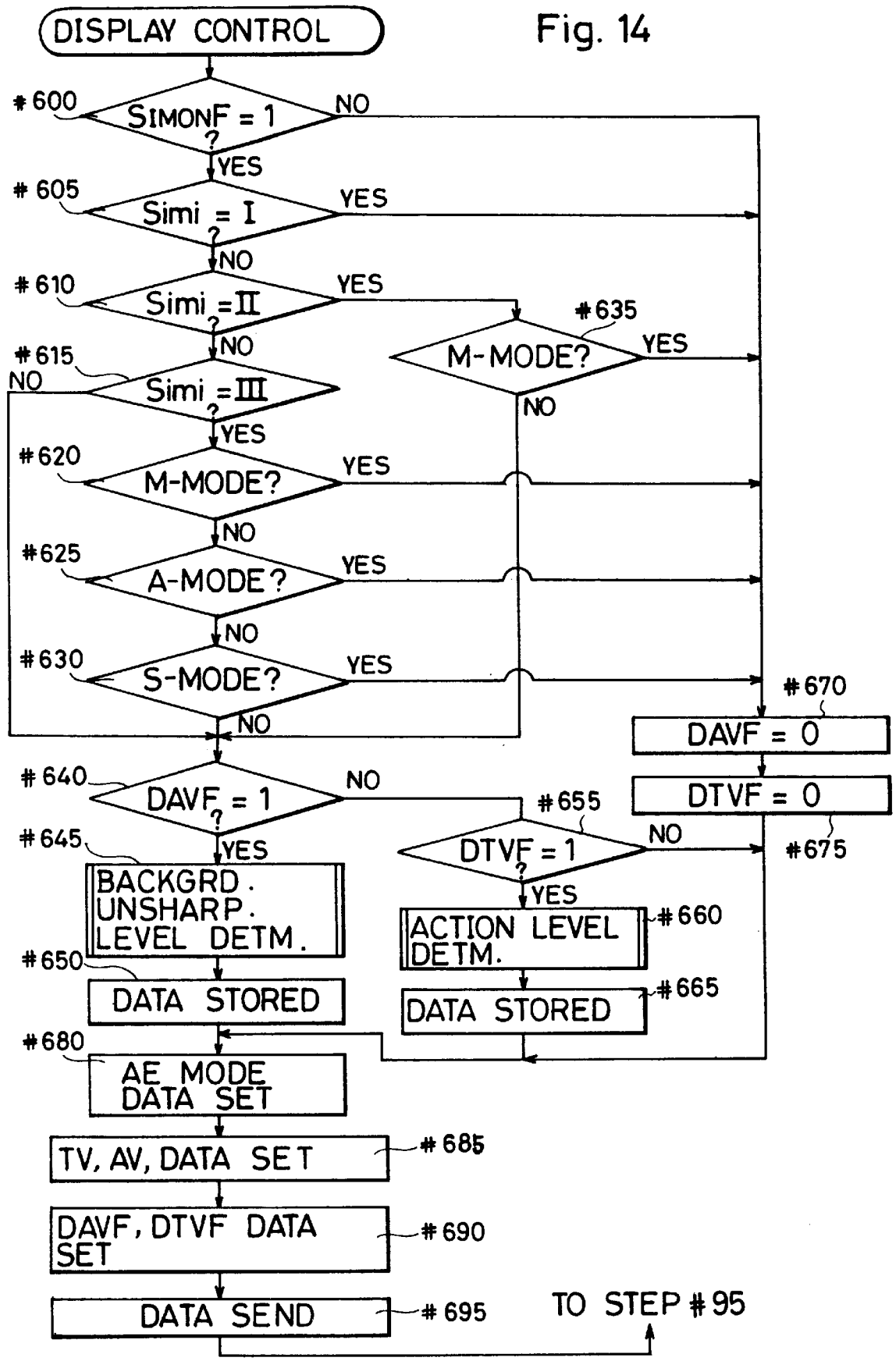
FIG. 14 is a flow chart showing a "Display Control Routine"

FIG. 14 is a flow chart showing the "Display Control Routine."

In this subroutine, firstly, it is discriminated whether the flag SIM0NF is set to 1 in Step #600. If the flag SIM0NF is set to 1 (YES in Step #600), it is discriminated whether the display mode I is currently set in Step #605. If the flag SIM0NF is reset to 0 or the display mode I is currently set (NO in Step #600 or YES #605), the flags DAVF and DTVF are reset to 0 respectively in Steps #670, #675, causing no image indicators to be displayed within the picture frame on the viewfinder screen. Then, this subroutine proceeds to Step #680.

On the other hand, if the display mode I is not set (NO in Step #605), it is discriminated whether the display mode II is currently set in Step #610. If the display mode II is currently set (YES in Step #610), it is discriminated whether the M-mode is currently set as exposure mode in Step #635. If the M-mode is currently set (YES in Step #635), no image indicator is to be displayed. Accordingly, this subroutine proceeds to Step #680 after resetting the flags DAVF and DTVF to 0 respectively in Steps #670, #675. If the M-mode is not currently set (NO in Step #635), this subroutine proceeds to Step #640. If the display mode II is not currently set (NO in Step #610), it is discriminated whether the display mode III is currently set in Step #615. If the display mode III is not currently set (NO in Step #615), it means that the display mode IV is currently set. Accordingly, this subroutine proceeds directly to Step #640. If the display mode III is set (YES in Step #615), it is discriminated in Steps-#620, #625. #630 whether any of the M-, A-, and S-modes is currently set as exposure mode. If the currently set exposure mode is any one of M-, A-, and S-modes (YES in Step #620, #625, or #630), the flags DAVF, DTVF are reset to 0 in Steps #670, #675 so that no image indicator is to be displayed. Then, this subroutine proceeds to Step #680. On the other hand, if the currently set exposure mode is none of M-, A-, and S-modes, i.e., P-mode (NO in Steps #620, #625, and #630), this subroutine proceeds to Step #640.

In other words, it is discriminated whether the flag DAVF is set to 1 in Step #640 in the following three cases: 1) Display mode II/any exposure mode but M-mode; 2) Display mode III/P-mode; and 3) Display mode IV/any exposure mode. If the flag DAVF is set to 1 (YES in Step #640), the background unsharpness level is calculated, i.e. a "Background Unsharpness Level Determination Routine" is executed in Step #645 and the calculated background unsharpness level is stored as background unsharpness data in a display data memory M for image indicators in Step #650. Then, this subroutine proceeds to Step #680. If, on the other hand, the flag DAVF is set to 0 (NO in Step #640), it is discriminated whether the flag DTVF is set to 1 in Step #655. If the flag DTVF is set to 1 (YES in Step #655), the action level is calculated, i.e., an "Action Level Determination Routine" is executed in Step #660 and the determined display condition is stored as data used to determine the action level in the display data memory M in Step #665. The display condition will be described later. Then, this subroutine proceeds to Step #680.

Subsequently, the data concerning the currently set exposure mode, shutter speed TV and aperture value AV, and data concerning the states of the flags DAVF, DTVF are set in Steps #680, #685, #690 respectively. The set data are sent to the display units 61, 62 in Step #695, whereby the unit 61 displays the received data in the form of the image indicator on the viewfinder screen based on the conditions set by means of the switches and flags.

Referring back to FIG. 5, upon completion of the "Display Control Routine," it is discriminated whether the switch S2 is in the ON state in Step #95. If the switch S2 is in the ON state (YES in Step #95), an exposure control is executed in Step #100. Then, this routine proceeds to Step #105 to wait for a next photographing operation.

On the other hand, if the switch S2 is in the OFF state (NO in Step #95), it is discriminated whether the timer flag TIMF is set to 1 in Step #110. If the flag TIMF is set to 1 (YES in Step #110), the power retention timer is reset and restarted in Step #120. Then, this routine returns to Step #15. If the flag TIMF is set to 0 (NO in Step #110), it is checked whether five seconds have elapsed since the start of the power retention timer in Step #115. If five seconds have not yet elapsed (NO in Step #115), this routine returns to Step #15. If five seconds have elapsed (YES in Step #115), it is determined that the operator has no intention of taking a picture. Thus, this routine enters a standby state for the next photographing operation in Step #105, completing the photography preparatory operation.

Next, there will be described the action level of a subject image with reference to FIGS. 15 to 19.

Figure 15:
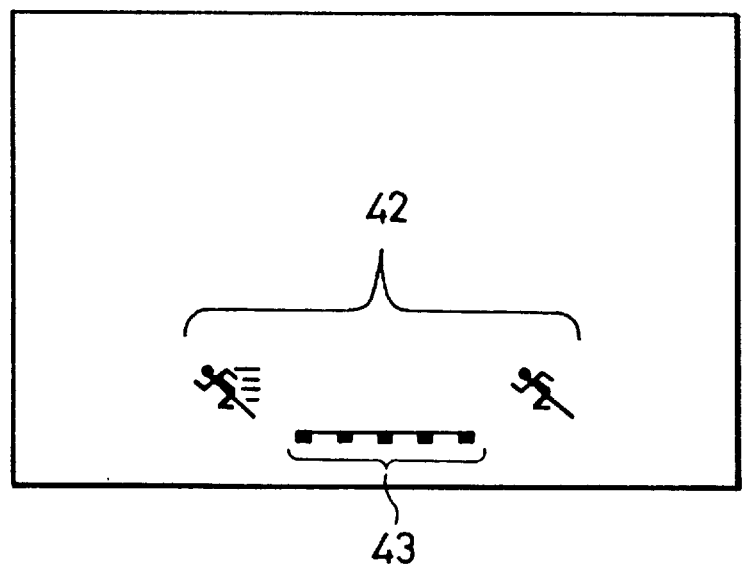
FIG. 15 is a diagram showing a displayed state of an action level indicator within a picture frame when a PS-, or S-mode is set.
Figure 16:
FIG. 16 is a diagram showing displayed states of the action level indicator within the picture frame at respective action levels when the PS-, or S-mode is set, wherein indices corresponding to the action levels are displayed.
Figure 16:
Figure 16:
Figure 16:
Figure 16:
Figure 17:
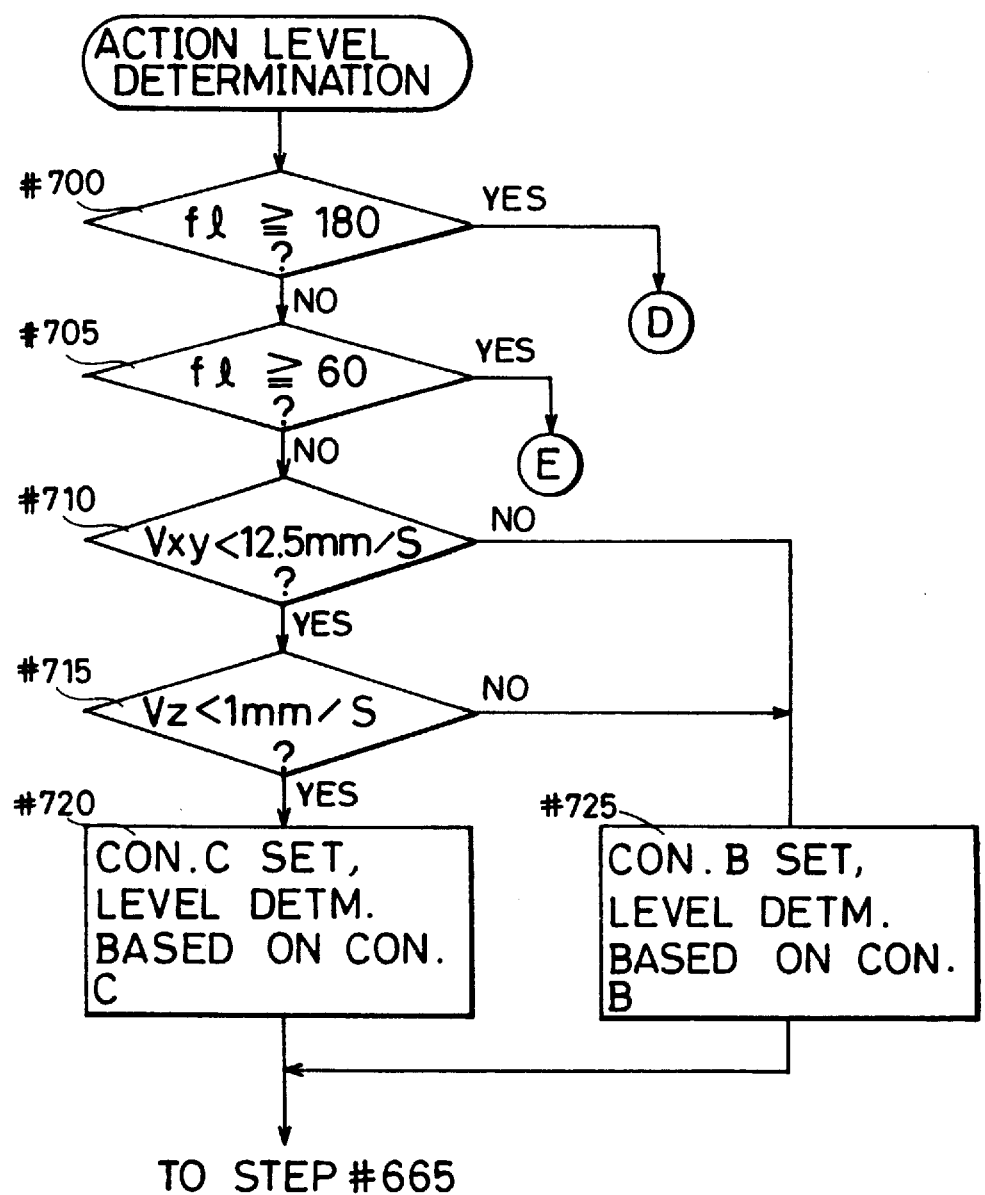
FIGS. 17, 18 and 19 are flow charts showing an "Action Level Determination Routine"
Figure 18:
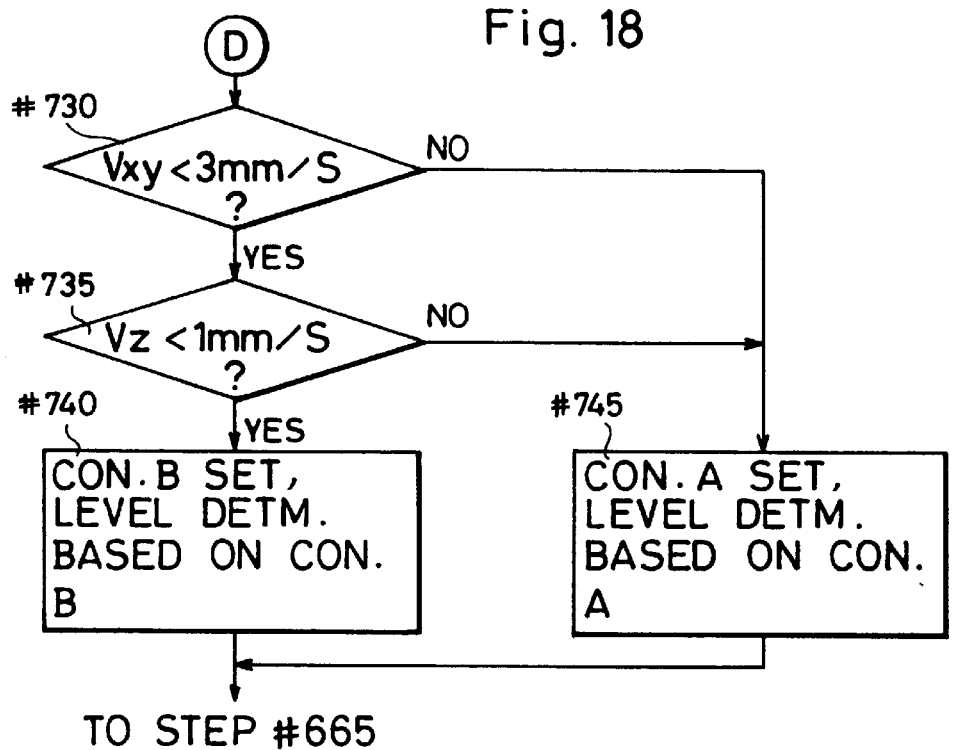
Figure 19:
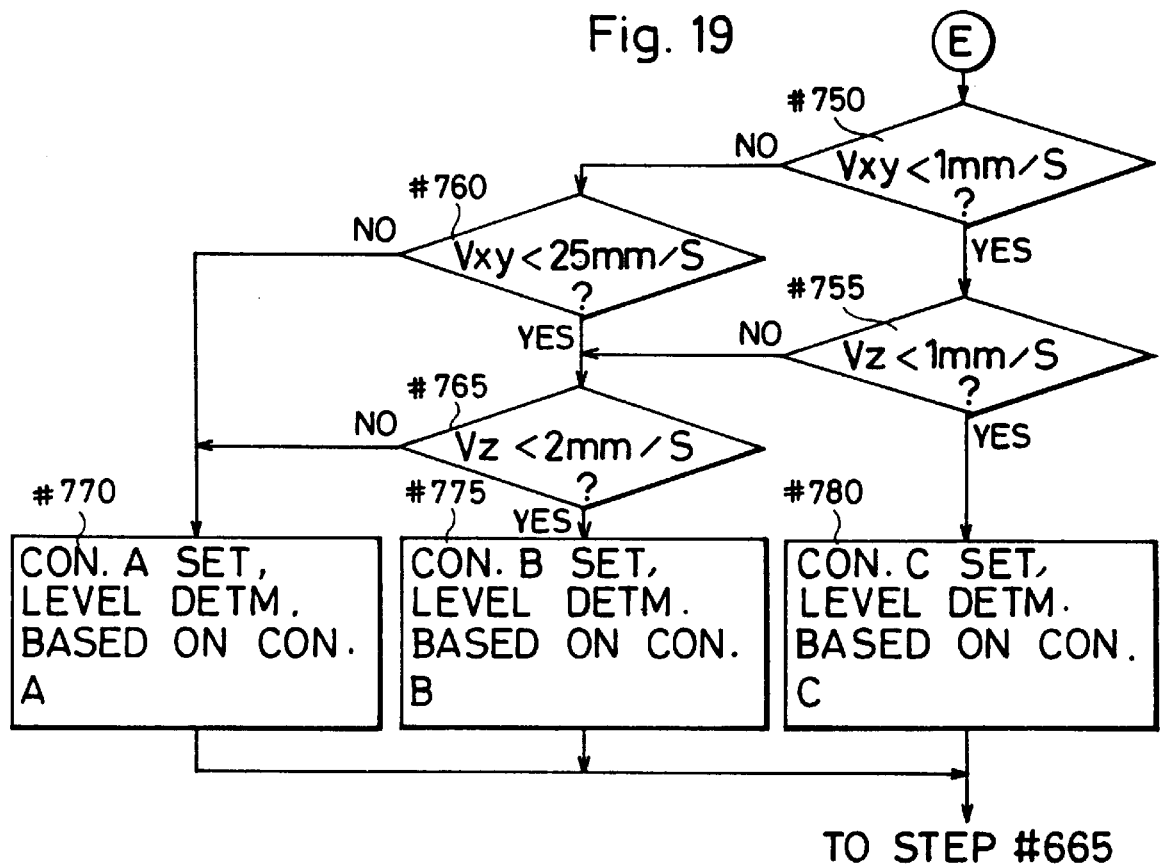

FIG. 15 is a diagram showing a displayed state of the action level indicator 42 within the picture frame when the PS-mode or P-mode is set. The action level indicator 42 includes the pictorial marks provided at right and left sides, level coordinate 43, and indices 44. As shown in FIG. 16, one of the indices 44 is lighted to show the corresponding action level.

TABLE-1 below shows respective action levels, and there are provided five action levels.

an inability of a metering area to cover the entire subject. In view of this, the shutter speed is increased by a specified amount, whereby to prevent the occurrence of the aforementioned discrepancy.

Further, as shown in TABLE-2 below, there are provided three display conditions A to C based on the focal length fl of the taking lens unit 31, blurring speed Vxy, and subject speed Vz, which are factors determining the magnification. An action level is determined based on the display condition as shown in TABLE-2 and shutter speed TV.

TABLE-2

| DISP. CONDITION | A | B | C |
|---|---|---|---|
| SETTINGS | | | |
| Vxy ≧ 180 mm | Vxy ≧ 3 mm/s or Vz ≧ 1 mm/s | Vxy < 3 mm/s and Vz < 1 mm/s | — |
| 60 mm ≦ fl and fl < 180 mm | Vxy ≧ 25 mm/s or Vz ≧ 2 mm/s | 1 mm/s ≦ Vxy < 25 mm/s or 1 mm/s ≦ Vz < 2 mm/s | Vxy < 1 mm/s and Vz < 1 mm/s |
| fl < 60 mm | — | Vxy ≧ 12.5 mm/s or Vz ≧ 1 mm/s | Vxy < 12.5 mm/s and Vz < 1 mm/s |
| Tv | | | |
| 1/1000 or greater | 5 | 5 | 5 |
| 1/750 to 1/500 | 4 | 5 | 5 |
| 1/350 to 1/250 | 3 | 4 | 5 |
| 1/200 to 1/125 | 2 | 3 | 4 |
| 1/90 to 1/60 | 1 | 2 | 3 |
| 1/45 to 1/30 | 1 | 1 | 2 |
| 1/20 or smaller | 1 | 1 | 1 |

TABLE-1

| ACTION LEVEL | ACTIVE STATE OF A PRINTED IMAGE |
|---|---|
| 5 | An entire main subject image looks still. |
| 4 | A rapid moving part of a main subject image looks slightly moving. |
| 3 | A part of a main subject image looks moving, exhibiting a lively motion. |
| 2 | A lively motion of an entire main subject image is emphasized. |
| 1 | An entire main subject image looks considerably moving. |

As can be seen from TABLE-1, the greater the action level, the stiller the main subject looks as a printed image. Conversely, the smaller the action level, the more actively the main subject looks moving. Factors determining how much the main subject image blurs (a blurring amount BM of the main subject image) include the magnification, subject speed Vz in addition to the blurring speed Vxy, shutter speed TV. As a criterion, the action levels are set based on the blurring amount BM of the main subject image on the film plane as follows; level 5: 0 μm ≦ BM<100 μm, level 4: 100 μm ≦ BM<200 μm, level 3: 200 μm ≦ BM<400 μm, level 2: 400 μm ≦ BM<800 μm, level 1: 800 μm ≦ BM. The displayed states of the respective action levels 1 to 5 are shown in FIG. 16. There may be some discrepancy between the action level displayed on the viewfinder screen and the action level exhibited in the final picture due to a time lag between the metering operation and exposure operation and Hereafter, determination and display of the action level will be described with reference to FIGS. 17 to 19.

In the "Action Level Determination Routine," firstly, it is discriminated whether the focal length fl of the taking lens unit 31 the CPU 1 has read from the LE circuit 2 is 180 mm or longer in Step #700. If fl<180 mm (NO in Step #700), it is discriminated whether the focal length fl is 60 mm or longer in Step #705.

If fl<60 mm (NO in Step #705), it is discriminated whether the already calculated blurring speed Vxy on the film plane is smaller than 12.5 mm/s in Step #710. If Vxy<12.5 mm/s (YES in Step #710), it is discriminated whether the already calculated subject speed Vz is smaller than 1 mm/s in Step #715. If Vz<1 mm/s (YES in Step #715), the display condition C is set and the action level is determined based on the display condition C and the currently set shutter speed TV in Step #720. The CPU 1 estimates and calculates an in-focus condition of the taking lens unit 31 based on the subject speed Vz so as to follow movement of the main subject and control the driving of the taking lens unit 31 based on this calculation result. In this respect, the CPU 1 executes a so-called automatic predictive focusing control.

On the other hand, if Vxy ≧ 12.5 mm/s (NO in Step #710) or Vz ≧ 1 mm/s (NO in Step #715), the display condition B is set in Step #725. Once the display condition is set, this subroutine returns to 665.

If fl ≧ 180 mm (YES in Step #700), it is discriminated whether the blurring speed Vxy is smaller than 3 mm/s in Step #730. If Vxy<3 mm/s (YES in Step #730), it is discriminated whether the subject speed Vz is smaller than 1 mm/s in Step #735. If Vz<1 mm/s (YES in Step #735), the display condition B is set and the action level is determined based on the display condition B and the currently set shutter speed TV in Step #740. If Vxy≧3 mm/s (NO in Step #730) or Vz≧1 mm/s (NO in Step #735), the display condition A is set and the action level is determined based on the display condition A and the currently set shutter speed TV in Step #745.

If 60 mm≦fl<180 mm (YES in Step #705), it is discriminated whether the blurring speed Vxy is smaller than 1 mm/s in Step #750. If Vxy<1 mm/s (YES in Step #750), it is discriminated whether the subject speed Vz is smaller than 1 mm/s in Step #755. If Vz<1 mm/s (YES in Step #755), the display condition C is set and the action level is determined based on the display condition C and the currently set shutter speed TV in Step #780. If Vxy≧1 mm/s (NO in Step #750), it is discriminated whether the blurring speed Vxy is smaller than 25 mm/s in Step #760. If Vxy<25 mm/s (YES in Step #760) or Vz≧1 mm/s (NO in Step #755), it is discriminated whether the subject speed Vz is smaller than 2 mm/s in Step #765. If Vxy≧25 mm/s (NO in Step #760) or Vz≧2 mm/s (NO in Step #765), the display condition A is set and the action level is determined based on the display condition A and the currently set shutter speed TV in Step #770. If Vz<2 mm/s (YES in Step #765), the display condition B is set and the action level is determined based on the display condition B and the currently set shutter speed TV. Then, this subroutine returns to Step #665.

As described above, when the appropriate display condition is set, the action level is determined based on the currently set shutter speed TV as shown in TABLE-2. The data representing the determined action level is sent to the display unit 61, which in turn displays the image indicator showing the determined action level by lighting the corresponding index in any manner shown in FIG. 16. Accordingly, the operator is allowed to obtain a desired lively motion of the main subject in the final picture by changing the shutter speed TV while viewing the image indicator displayed in the viewfinder unit 34. In this case, if the viewfinder unit 34 is provided with a real-time display unit which displays the action level varying according to movement of the main subject, it becomes perplexingly difficult for the operator to make use of the image indicator. Accordingly, in this embodiment, the action level is determined mainly based on the focal length fl as described above.

Further, in this embodiment, both the subject speed Vz and blurring speed Vxy are used as relative speeds between the camera and main subject, which are required for determining the action level. However, in some photographing settings, it may be sufficient to use only either the subject speed Vz or blurring speed Vxy as a relative speed between the camera and main subject. In such cases, it is possible to calculate only either one of the above speeds Vz, Vxy to determine the action level.

Next, determination and displayed of the background unsharpness level with reference to FIGS. 20 to 27.

Figure 20:
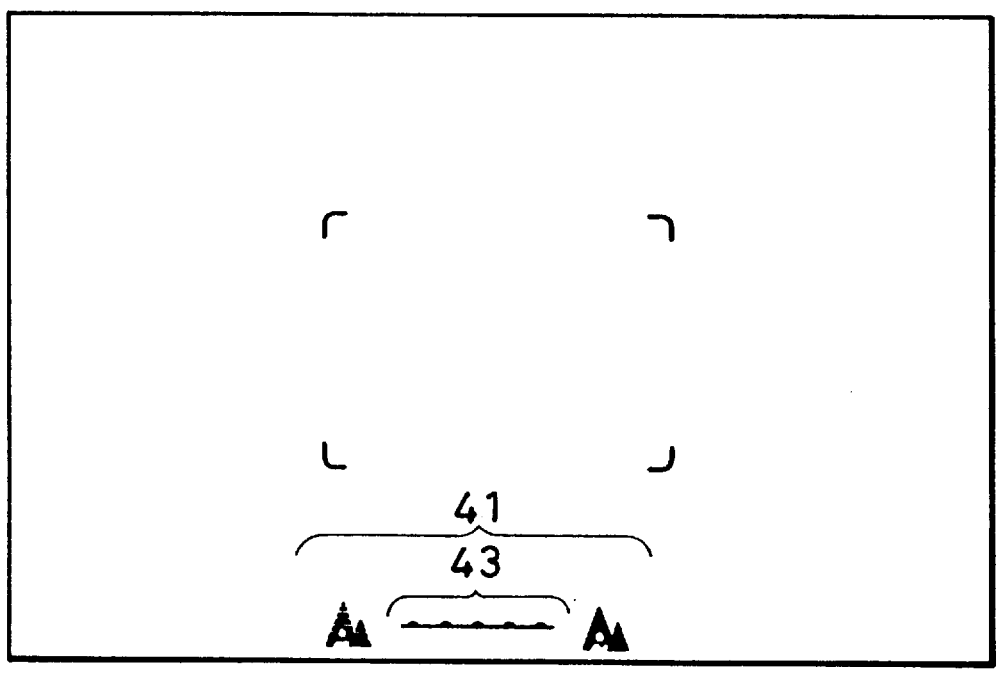
FIG. 20 is a diagram showing a displayed state of a background unsharpness level indicator within the picture frame when a PA-, or A-mode is set.
Figure 21:
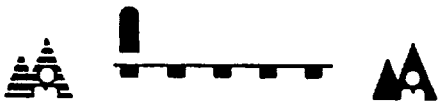
FIG. 21 is a diagram showing displayed states of the background unsharpness level indicator within the picture frame at respective background unsharpness levels when the PA-, or A-mode is set, wherein indices corresponding to the respective background unsharpness levels are displayed.
Figure 21:
Figure 21:
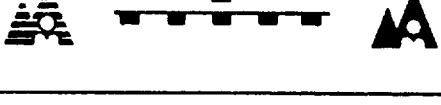
Figure 21:
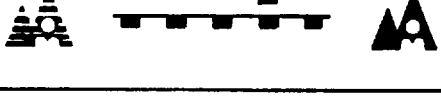
Figure 21:

FIG. 20 is a diagram showing a display state of the background unsharpness level indicator 41 within the picture frame when the PA-, or A-mode is set. The background unsharpness level indicator 41 includes the pictorial marks provided at right and left sides, level coordinate 43, and indices 44. As shown in FIG. 21, one of the indices 44 is lighted to show the corresponding background unsharpness level.

TABLE-3 below describes definitions of respective background unsharpness levels. There are provided five background unsharpness levels.

TABLE 3

| BACKGROUND UNSHARPNESS LEVEL | UNSHARPNESS OF BACKGROUND IN FINAL PICTURE | IMPRESSION |
| --- | --- | --- |
| 1 | Every detail of the picture (both a main subject image and a background subject image) is in focus. | A picture whose main subject image is an entire ↑ image printed therein |
| 2 | A background subject image is less sharply focused than a main subject image, but still well-depicted. | A picture relatively depicting a place and a |
| 3 | Contrast of detailed patterns of a background subject image is low, but the background subject image is still recognizable. | state where it is taken by suppressing unsharpness of a background subject image |
| 4 | A background subject image is almost unrecognizably unsharp. A main subject image stands out in a picture. | A stereoscopic picture in |
| 5 | A background subject image is totally unrecognizably unsharp. thus a main subject image further stands out in a picture. | which only a main subject ↓ image stands out due to an unsharp background subject image |

As can be seen from TABLE-3, the higher the background unsharpness level, the less sharp the background subject image becomes relative to the main subject image, whereby making the main subject image look stood-out in the final picture. Conversely, the lower the background unsharpness level, the more sharp the background subject image becomes relative to the main subject image. These background unsharpness levels may be numerically expressed. Specifically, calculation is carried out to obtain a diameter δ of a circle of confusion of the background subject image (hereinafter referred to merely as diameter δ) relative to the main subject image in focus, and the unsharpness of the background subject image in the final picture is expressed by the obtained diameter δ. The diameter δ is defined in the following equation.

$$\delta = (fl/AV) \times \beta \times \{1 - (1/k)\} \tag{1}$$

where fl denotes a focal length, AV denotes an aperture value, β denotes a magnification, and k denotes a ratio of the distance to the background to that to the main subject, i.e., a distance factor. The distance factor k, in other words, is used to indicate that the background is k-times as far from the camera as the main subject.

The background unsharpness levels 1 to 5 may be expressed by specific numerical values of the diameter δ as shown in TABLE-4. Hereafter, relationship between the background unsharpness level and the diameter δ is referred to as L-δ relationship.

TABLE 4

| UNSHARPNESS LEVEL | RANGE OF THE DIAMETER δ |
|---|---|
| 1 | shorter than 50 μm |
| 2 | 50 to 180 μm |
| 3 | 180 to 440 μm |
| 4 | 440 to 900 μm |
| 5 | 900 μm or longer |

The L-δ relationship was prepared as follows. Images photographed under a variety of photographing conditions were printed pictures of 114 mm×82 mm each. The obtained pictures were observed by a plurality of observers under the normal light condition. It was discriminated based on the observers' impressions within which background unsharpness level the pictures fell with reference to TABLE-3. Thereafter, the diameters 6 of the pictures whose background unsharpness levels were thus discriminated were measured. Based on the measurement results was prepared L-δ relationship as shown in TABLE-4.

The L-δ relationship shown in TABLE-4 is prestored in a memory provided in a microcomputer. Alternatively, the L-δ relationship may be stored in a memory card detachably mountable to the camera main body.

Figure 22:
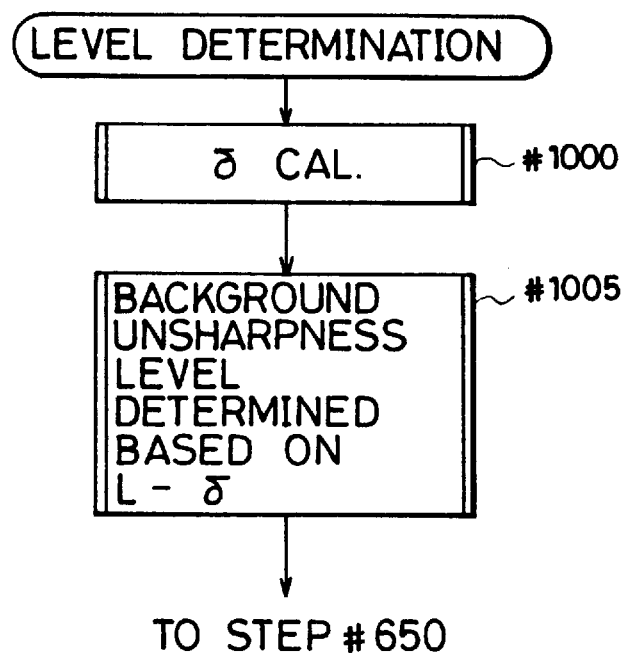
FIG. 22 is a flow chart showing a "Background Unsharpness Level Determination Routine"

FIG. 22 is a flow chart showing the "Background Unsharpness Level Determination Routine."

Firstly, the diameter δ is calculated in Step #1000. Then, the background unsharpness level is determined based on the calculated diameter δ and the prestored L-δ relationship in Step #1005. Consequently, this subroutine returns to Step #650. Operations executed in Steps #1000 and #1005 will be described with reference to FIGS. 23 to 27.

Figure 23:
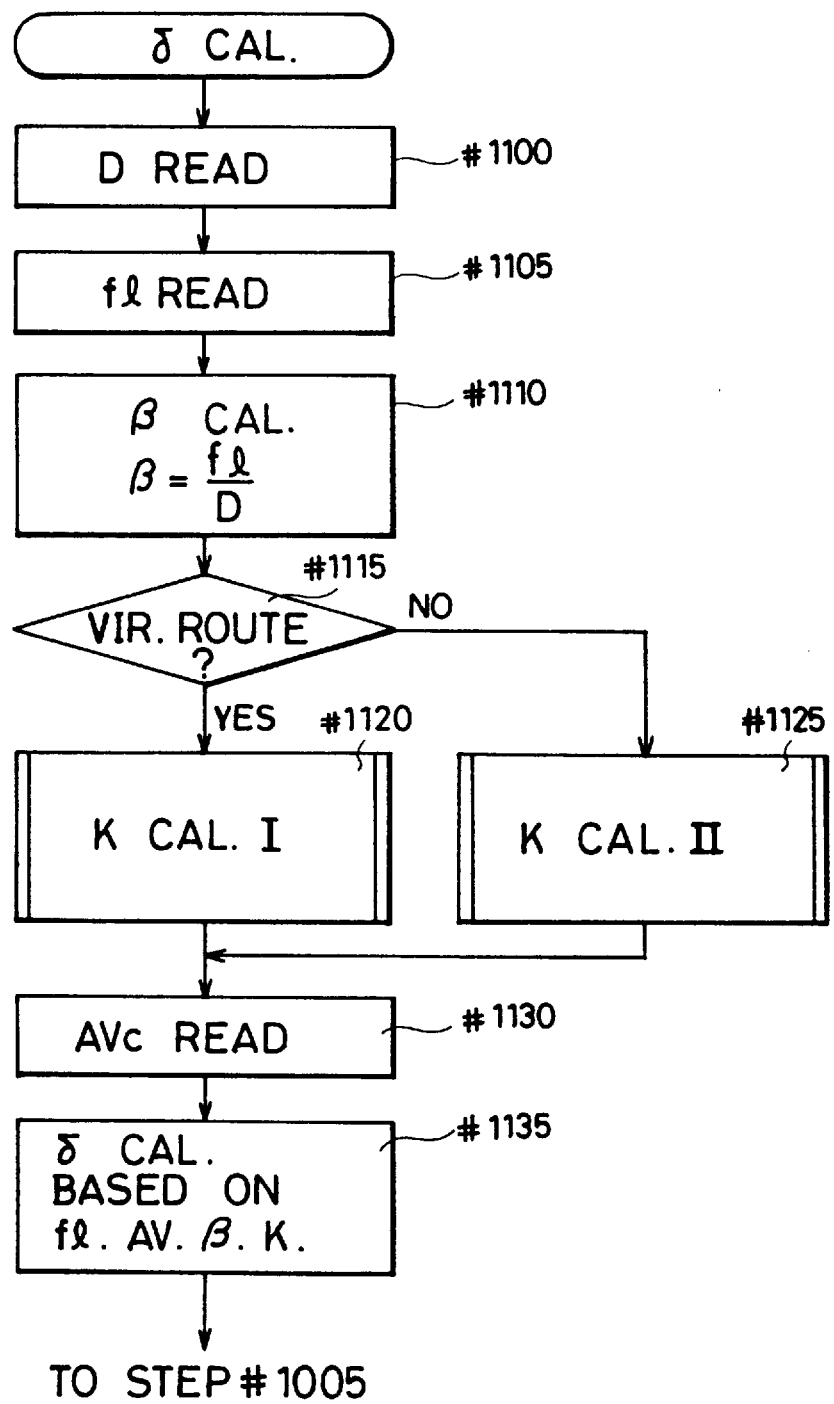
FIG. 23 is a flow chart showing a "Diameter δ Calculation Routine"

FIG. 23 is a flow chart showing a "Diameter δ calculation Routine."

In this subroutine, firstly, the distance D to the main subject obtained during the AF control is read in Step #1100, and the currently set focal length fl of the taking lens unit 31 is read from the LE circuit 2 in Step #1105. The CPU 1 calculates the magnification β (=fl/D) based on the main subject distance D and the focal length fl in Step #1110. Subsequently, it is discriminated whether a virtual route is to be selected in Step #1115.

As can be seen from the equation (1), calculation of the diameter δ requires the focal length fl, aperture value AV, magnification β, and distance factor k. The focal length fl and aperture value AV can be obtained from set values. The magnification β is calculated based on the already obtained focal length fl and main subject distance D. A distance Dbac to the background subject (hereinafter referred to as background distance Dbac) is measured, and the distance factor k is calculated based on the main subject distance D and measured background distance Dbac.

Figure 24:
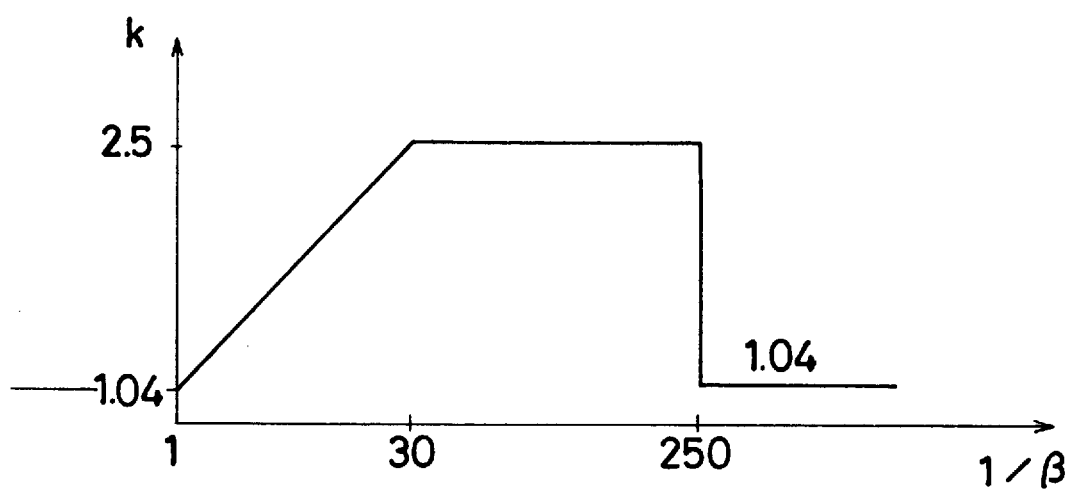
FIG. 24 is a graphical representation showing relationship between a distance factor and a magnification.

It has been confirmed to be possible to set empirical relationship between the distance factor k and magnification β (hereinafter referred to as β-k relationship) as shown in FIG. 24. The distance factor k is a fixed value in a normal photography range where the magnification β is between 1/30 and 1/250. However, in a macro photography range where the magnification β is between 1/1 to 1/30, the depth of field decreases. Accordingly, if the same distance factor k as the one used in the normal photography range is used in the macro photography range, the background unsharpness levels defined in TABLE-3 cannot be used. In view of this, the distance factor k is made variable according to the magnification β in the macro photography range, so that the background unsharpness level indicator as described above can be used in this range as well. The distance factor k is set in the macro photography range such that an impression provided by a subject image obtained by the normal photography is substantially similar to that obtained by the macro photography. In a zoom-macro photography range where the magnification β is greater than 1/1, the distance factor k is fixed at 1.04, i.e. the background unsharpness level is fixed at level 1. The distance factor k is changed so that one range is changed into the next one as the magnification β changes without causing a noticeably large gap in the impression the subject image provides in a final picture under the same photographing conditions. In a distant range where the magnification β is 1/250 or smaller, the background unsharpness level is fixed at level 1. In the "Diameter δ Calculation Routine," it is made possible not only to calculate the distance factor k by actually measuring the background distance Dbac, but also to virtually obtain the distance factor k in accordance with the β-k relationship. In other words, there are provided two routes between Step #1115 and Step #1130; a measurement route and a virtual route. Selection of these routes is enabled by providing a desired switch. Alternatively, the arrangement may be such that the virtual route is automatically selected when the measurement of the background distance Dbac is difficult. The β-k relationship is stored in a memory provided in the CPU 1.

Figure 25:
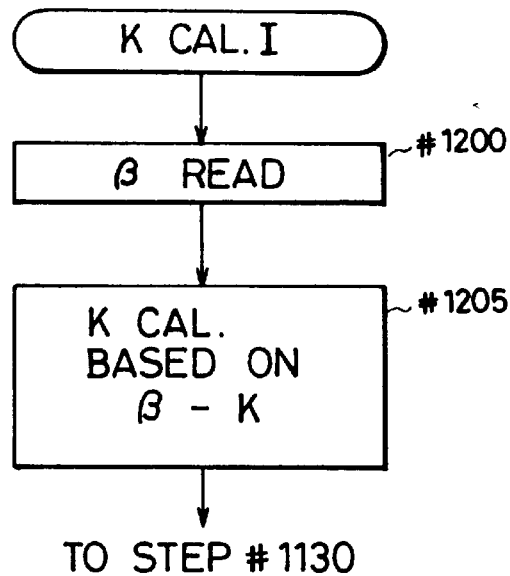
FIG. 25 is a flow chart showing a "Distance Factor k Calculation Routine I"
Figure 26:
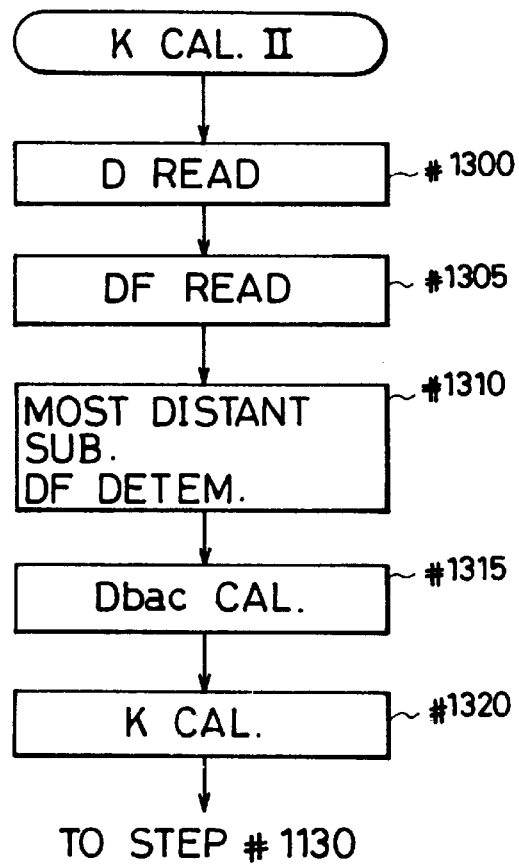
FIG. 26 is a flow chart showing a "Distance Factor k Calculation Routine II"

Specifically, if the virtual route is selected (YES in Step #1115), the distance factor k is obtained in a "Distance Factor k Calculation Routine I" shown in FIG. 25 in Step #1120. Firstly, the magnification β obtained in Step #1110 is read in Step #1200, and the distance factor k is obtained in accordance with the prestored β-k relationship in Step #1205. Consequently, this subroutine returns to Step #1130.

On the other hand, if the measurement route is selected (NO in Step #1115), the distance factor k is calculated based on the actually measured background distance Dbac. More specifically, the distance factor k is calculated in a "Distance Factor k Calculation Routine II" shown in FIG. 26 in Step #1125. Firstly, the main subject distance D is read in Step #1300, and a plurality of defocus amounts are read in Step #1305. In this embodiment, a frame of image is divided into a plurality of detecting areas in order to discriminate the background subject image over the main subject image, and the defocus amount is calculated in each detecting area. Then, discriminated is the defocus amount in the detecting area covering the most distant subject out of thus calculated defocus amounts in the respective detecting areas in Step #1310. The background distance Dbac is calculated based on the discriminated defocus amount in Step #1315. Consequently, the distance factor k is calculated based on the main subject distance D and background distance Dbac, and this subroutine returns to Step #1130.

Referring back to FIG. 23, a currently set aperture value AV, i.e., control aperture value AVc is read in Step #1130. Consequently, in Step #1135, the diameter δ is calculated based on the read focal length fl, aperture value AVc, magnification β, and distance factor k using the equation (1).

Figure 27:
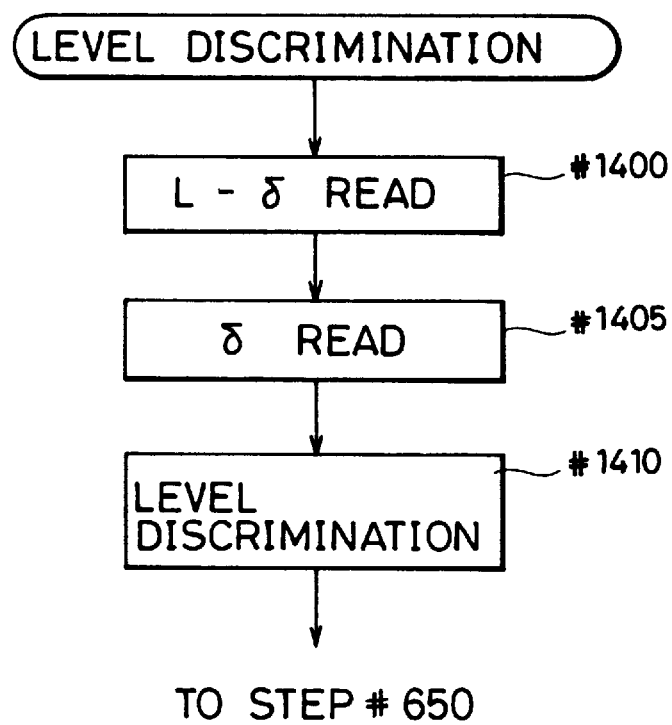
FIG. 27 is a flow chart showing a "Background Unsharpness Level Discrimination Routine"

Next, in Step #1005, the background unsharpness level under the set photographing conditions is determined based on the calculated diameter δ in a "Background Unsharpness Level Discrimination Routine" shown in FIG. 27. Specifically, the L-δ relationship and the calculated diameter δ are read respectively in Steps #1400 and #1405. In Step #1410, it is discriminated within which diameter range the calculated diameter δ falls in accordance with the L-δ relationship and thereby the background unsharpness level is determined. Then, this subroutine returns to Step #650.

Figure 28:
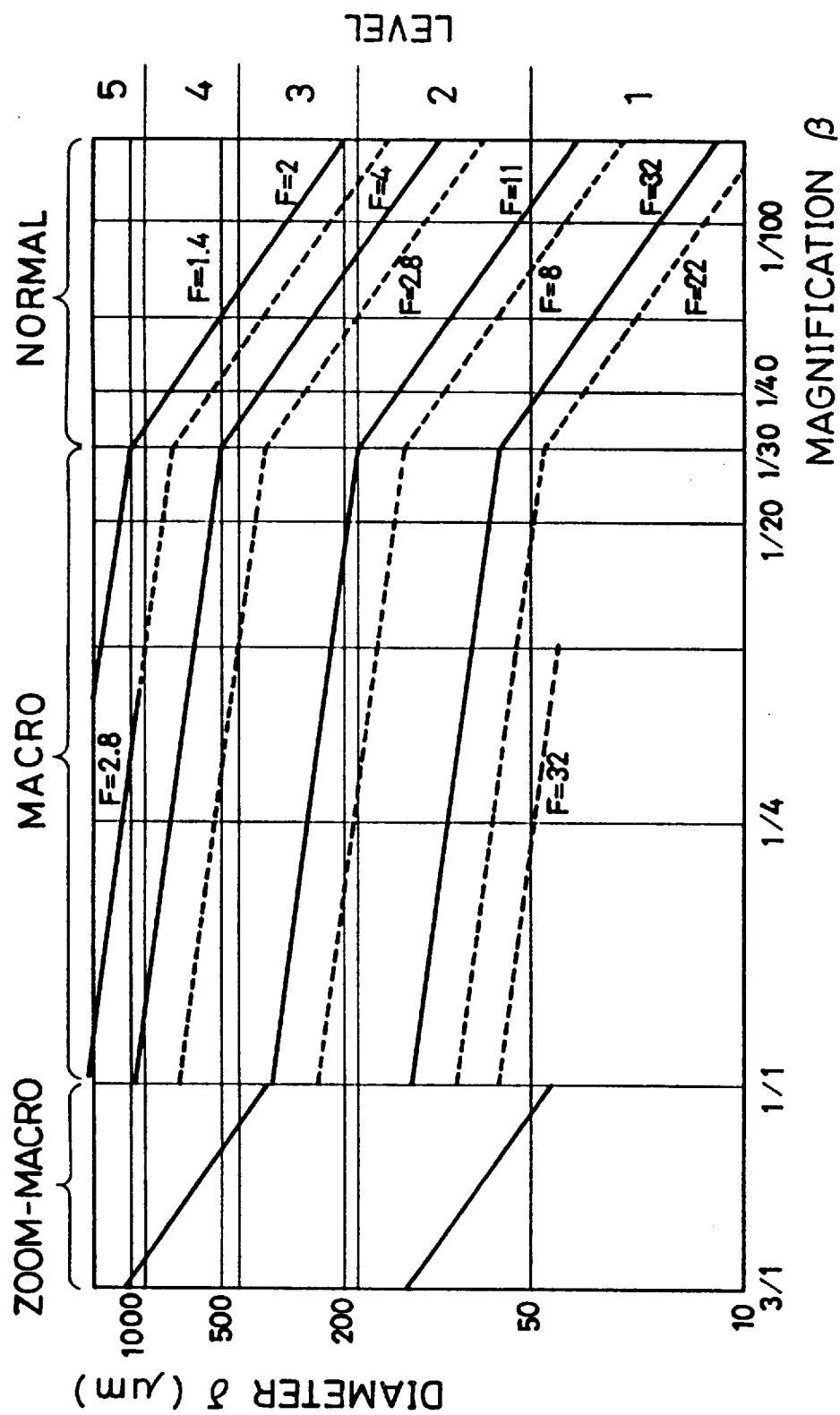
FIG. 28 is a graphical representation showing relationship between a diameter of circle of confusion of a background subject, a background unsharpness level, and a magnification.

FIG. 28 is a graphical representation showing relationship between the diameter δ and the background unsharpness level using the magnification β and f-number of the taking lens unit 31 as parameters. In this graph, the distance factor k is set at 2.5, and a value of F denotes an f-number of the taking lens unit 31, and there are shown eight different taking lenses as examples whose f-numbers are 1.4; 2; 2.8; 4; 8; 11; 22; and 32.

As will be apparent from the graph, as the magnification β increases, i.e., as a photography mode changes from a normal photography mode to a macrophotography mode, and further to a zoom-macrophotography mode, the diameter δ becomes greater, thereby advancing the background unsharpness level to the higher. Further, in the case where the f-number of the taking lens unit 31 is small, for example, 1.4 and 2, the background unsharpness level will approximately lie in a range defined by the background unsharpness levels 3 to 5. On the contrary, in the case where the f-number of the taking lens unit 31 is large, for example, 22 and 32, the background unsharpness level will approximately lie in a range defined by the background unsharpness levels 1 to 3.

In this embodiment, levels of visual effects, namely the background unsharpness level and action level, are displayed within the picture frame on the viewfinder screen as if superimposed with the subject image to be photographed. However, a separate display unit may be provided to indicate the levels of these visual effects.

Next, a second embodiment of the invention will be described with reference to FIGS. 29 to 33. In the second embodiment, the construction of a camera is such that an operator is allowed to select a desired background unsharpness level and an exposure is automatically controlled so as to obtain the selected background unsharpness level.

Figure 29:
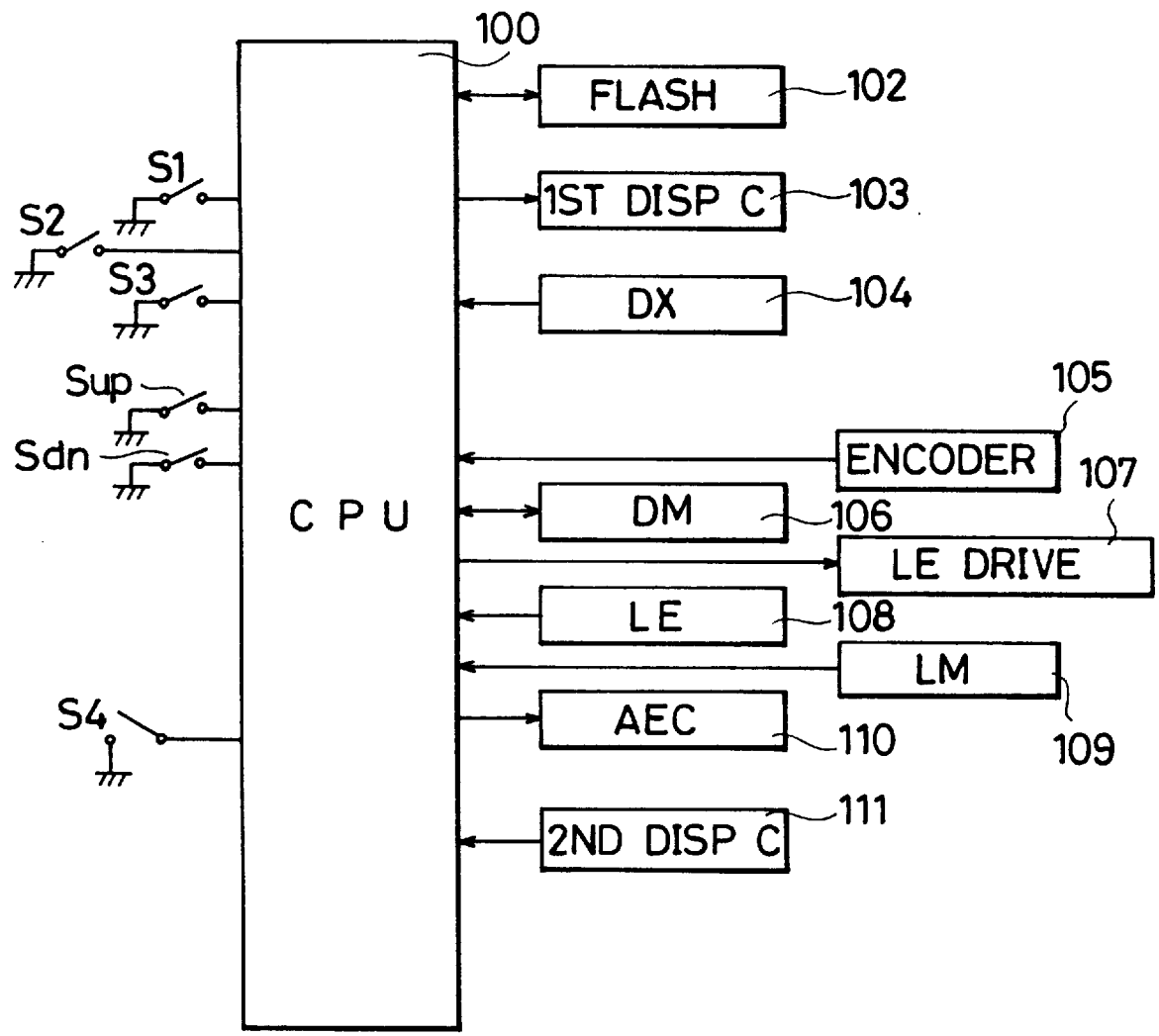
FIG. 29 is a block diagram showing a control system incorporated into a second camera embodying the invention.

FIG. 29 is a block diagram showing a control system of a second camera embodying the invention. Basically, the control system of the second camera is similar to the one shown in FIG. 1. In FIG. 29, designated at 100 is a microcomputer (CPU) for controlling overall operations of the camera, and individual circuits to be described below are designed to operate under the control of the CPU 100. To the CPU 100 are connected switches S1 to S4, an up-key Sup, and a down-key Sdn.

The switch S1 is a switch for starting a light measuring operation and a focus detecting operation. The switch S2 is a release switch; the switch S3 a background priority mode switch; and the switch S4 a focus mode changeover switch for selecting either an auto-focus mode or manual-focus mode. It should be understood that the background priority mode is a photography mode in which an operator is allowed to select desired background sharpness level using the background unsharpness indicator 126 displayed on the viewfinder screen. The up-key Sup and down-key Sdn are switches used to select a desired background unsharpness level. Since there are provided five background unsharpness levels shown in TABLE-4 in this embodiment, the desired background unsharpness level is selected out of those five levels.

Figure 30:
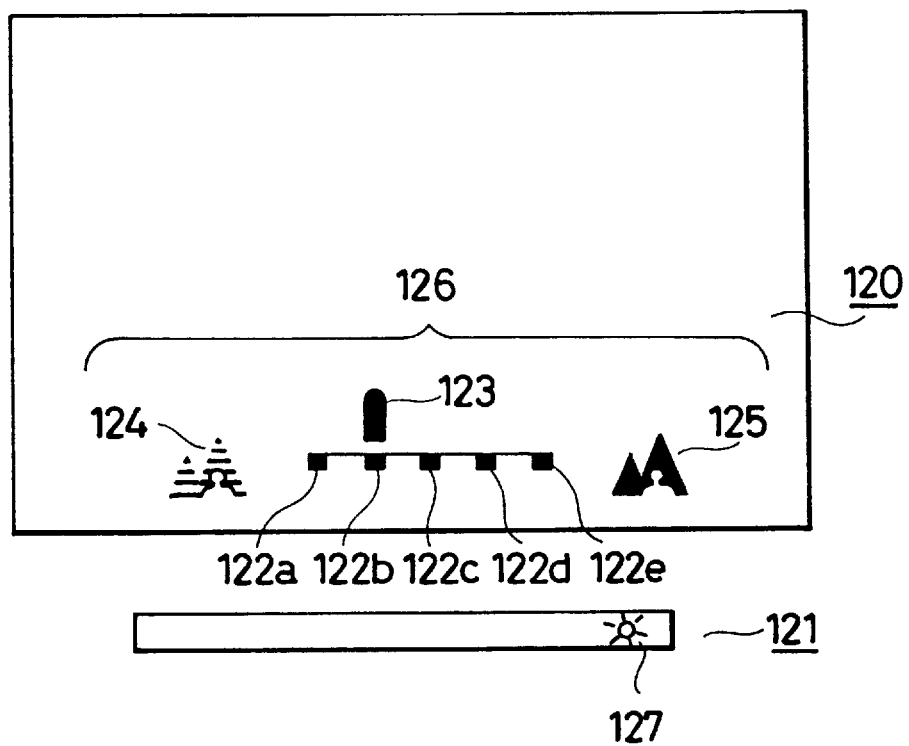
FIG. 30 is a diagram showing indications displayed on a viewfinder screen.

Designated at 102 is a flash device, and at 103 a first display circuit for displaying indicators in display units which include an unillustrated display unit provided on an outer face of a body of the camera and an out-of-frame display unit 121 provided outside a picture frame on a viewfinder screen as shown in FIG. 30. On the other hand, a second display circuit 111 displays indicators in an in-frame display unit 120 provided inside the picture frame on the viewfinder screen shown in FIG. 30. As a display device for the in-frame display unit 120 is used a transparent liquid crystal display (LCD).

A background unsharpness level indicator 126 for indicating the background unsharpness level under the set photographing conditions is provided in the in-frame display unit 120. The background unsharpness level indicator 126 includes a level coordinate having fixed level marks 122a to 122e representing five stages of background unsharpness level, index 123, unsharpness mark 124 and sharpness mark 125 provided at opposite sides of the level coordinate. The unsharpness mark 124 represents a state where a background subject image is most unsharp relative to a main subject image, whereas the sharpness mark 125 represents a state where the background subject image is most sharp relative to the main subject image. The level marks 122a to 122e represent background unsharpness levels 1 to 5 respectively. On the other hand, in the out-of-frame display unit 121, there are provided indicators such as a warning indicator 127, shutter speed indicator (not shown), and aperture indicator (not shown).

Designated at 104 is a film information reader circuit for reading film information (generally provided on a film cartridge) including ISO sensitivity and the number of frames of a film. Designated at 105 is an encoder for counting the number of drive pulses generated while a taking lens unit is driven. Designated at 107 is a lens drive circuit for driving a motor for driving a focusing lens and another motor for driving a zoom lens, and at 106 a distance measuring circuit. Designated at 108 is a lens information reader circuit for reading lens information including a focal length and an f-number of the taking lens unit. Designated at 109 is a light measuring circuit including a photodetector device and a photodetector circuit for detecting the brightness BV of the subject. Designated at 110 is an exposure circuit for executing an exposure operation by controlling a shutter speed and an aperture value.

Figure 31A:
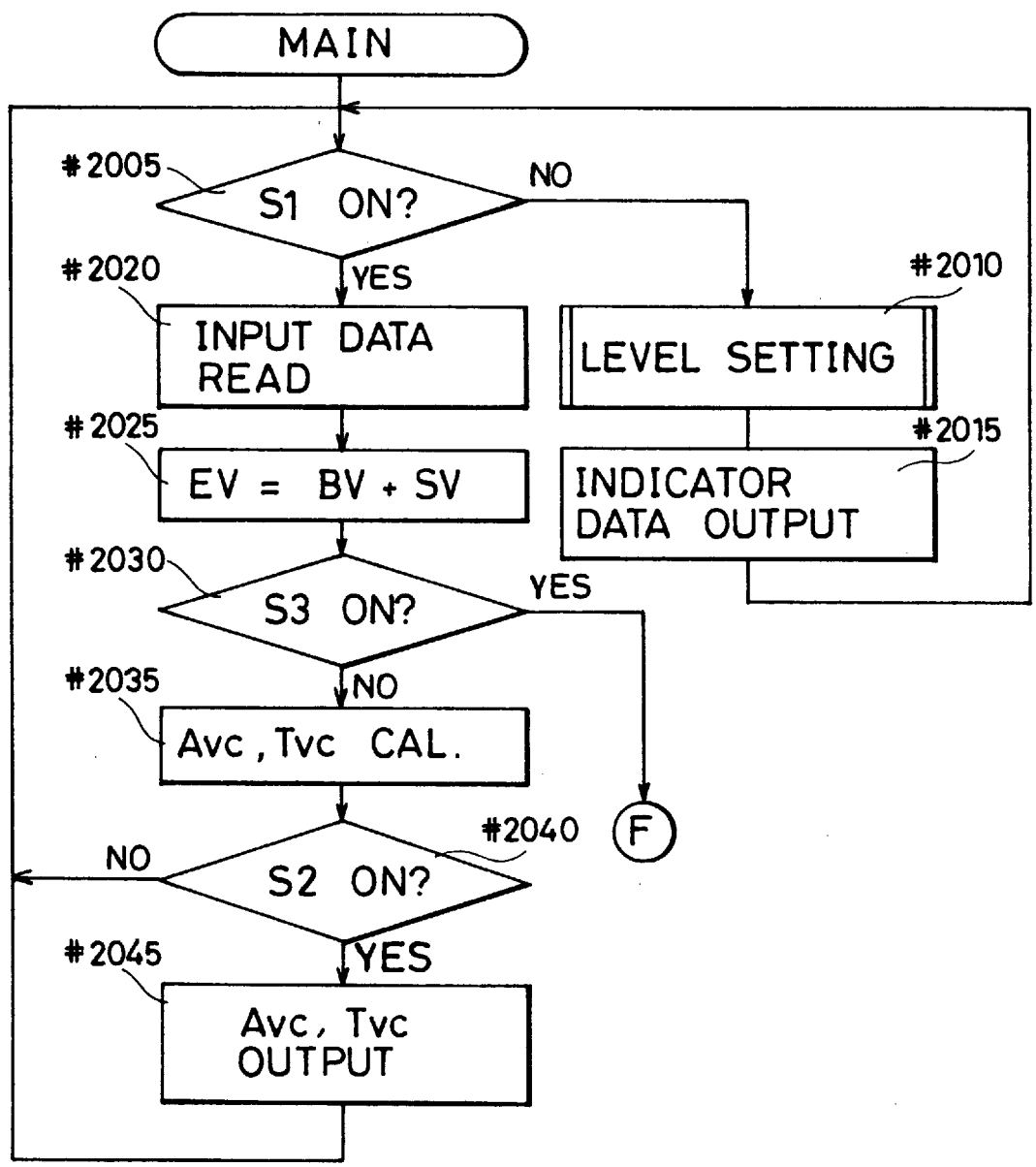
FIGS. 31A, 31B, 31C, and 31D are flow charts showing a "Control Routine"
Figure 31B:
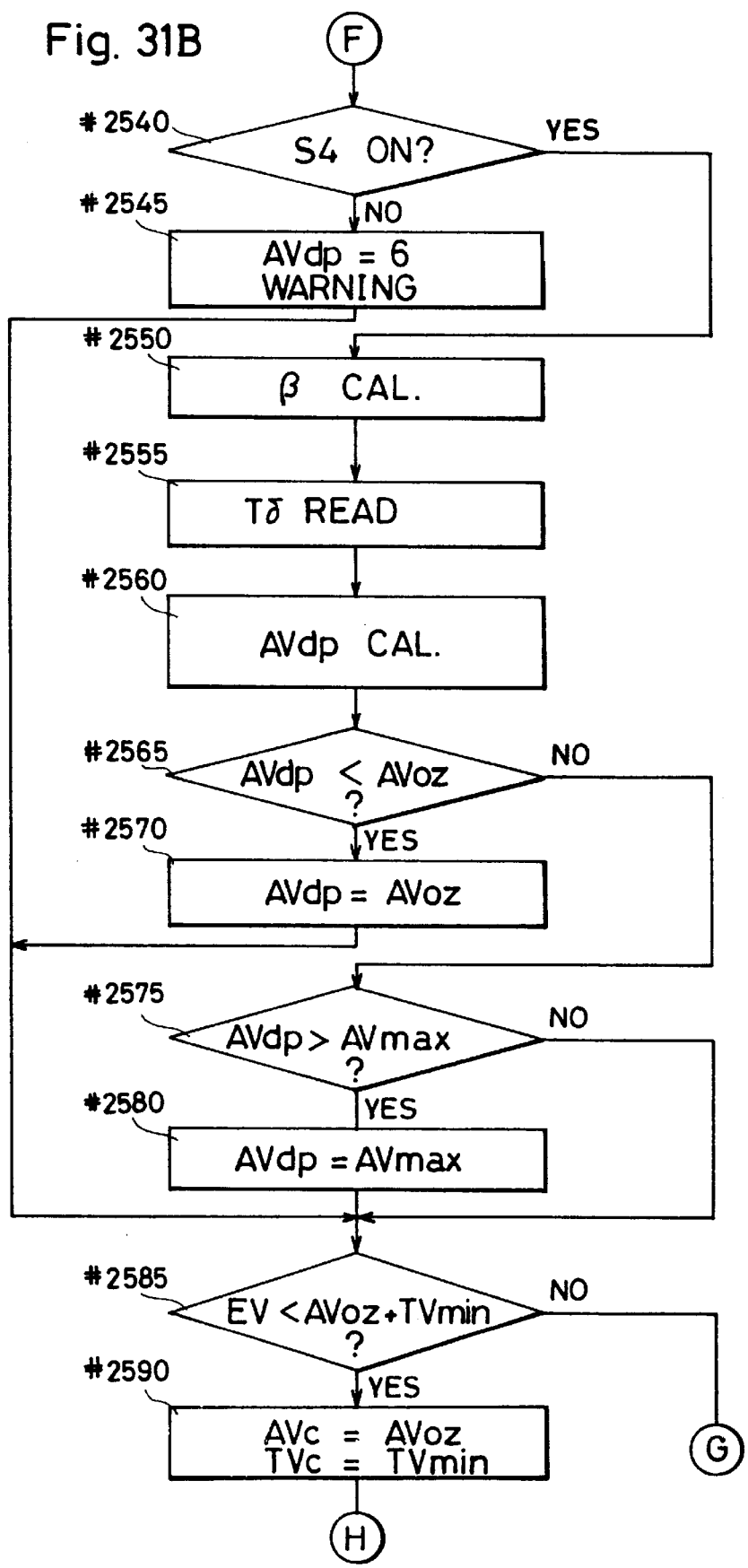
Figure 31C:
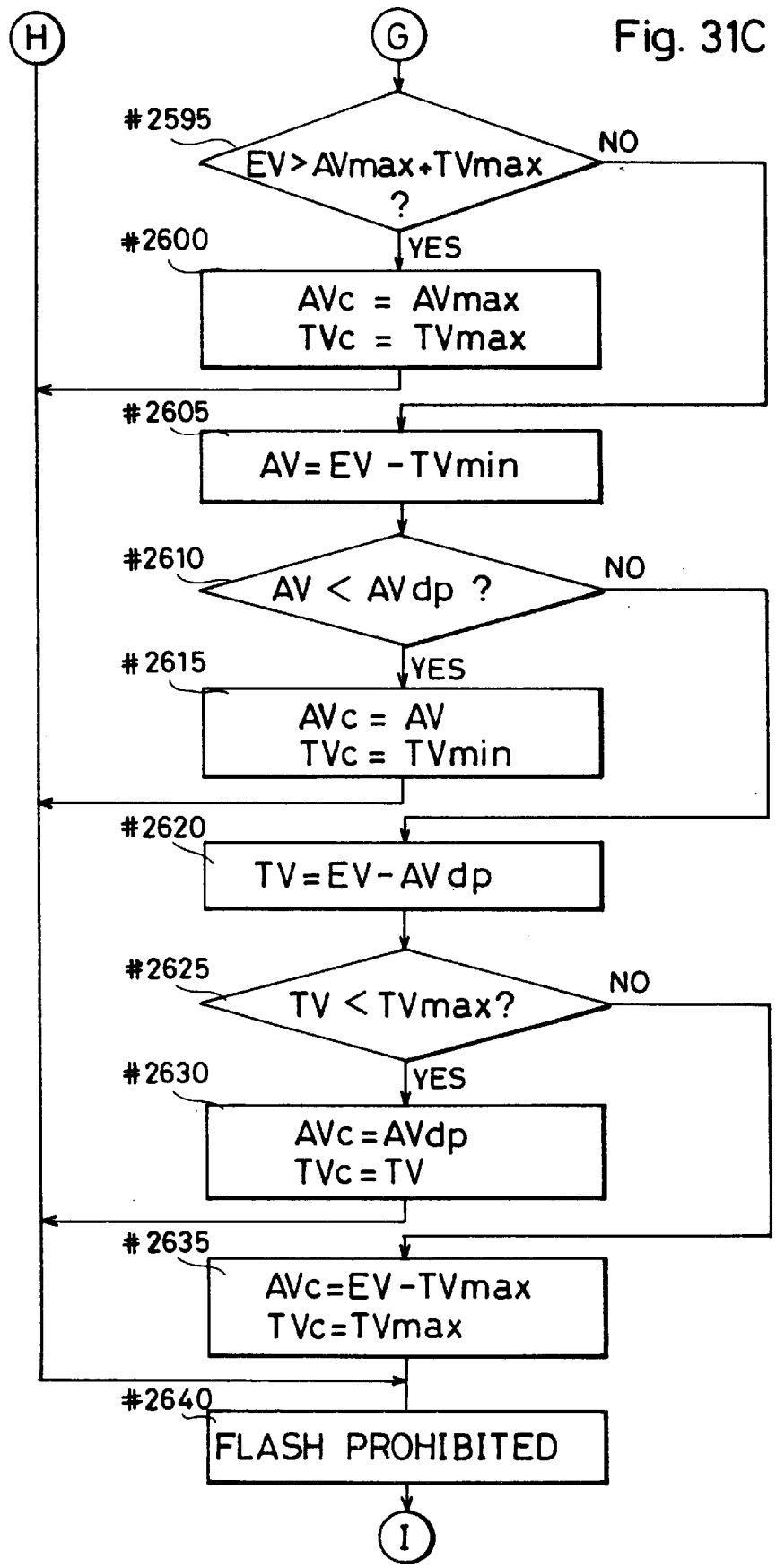
Figure 31D:
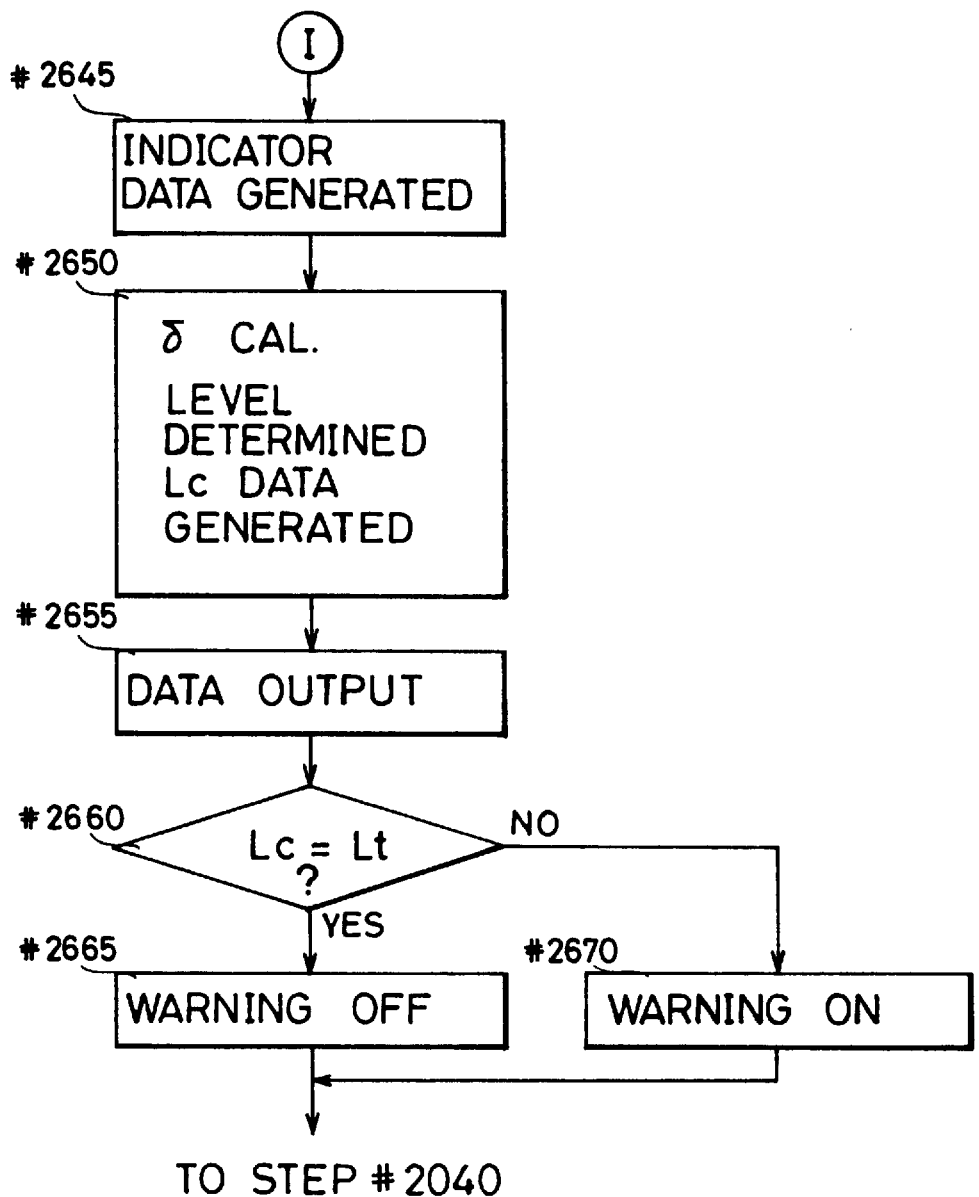
Figure 32:
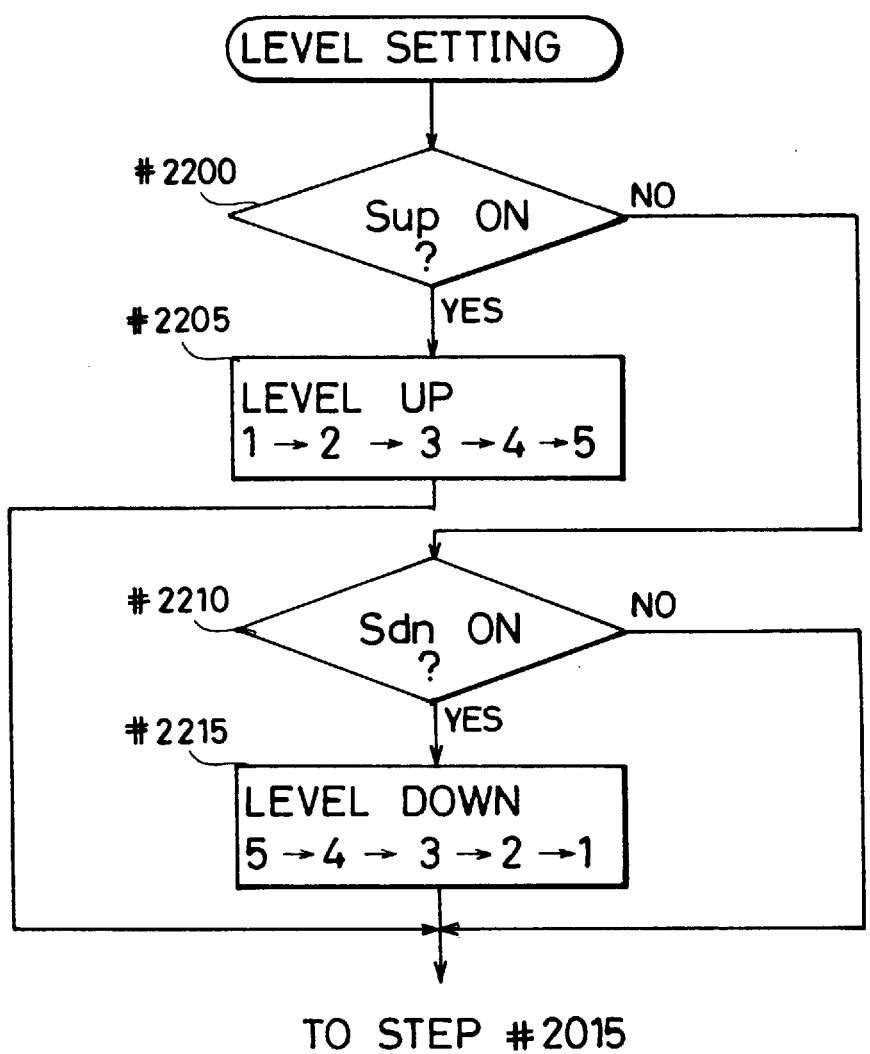
FIG. 32 is a flow chart showing a "Background Unsharpness Level Setting Routine"

Next, a control routine (main routine) of the second camera will be described with reference to flow charts shown in FIGS. 31A to 32.

Upon start of the main routine, it is first discriminated whether the switch Si is in the ON state in Step #2005. If the switch S1 is in the OFF state (NO in Step #2005), this routine proceeds to Step #2010 in which a "Background Unsharpness Level Setting Routine" shown in FIG. 32 is executed. In this subroutine, it is first discriminated whether the up-key Sup is in the ON state in Step #2200. If the up-key Sup is in the ON state (YES in Step #2200), the background unsharpness level is shifted toward the higher stages and set at a desired stage in Step #2205. Consequently, this subroutine returns to Step #2015. At this time, the operator manipulates the up-key Sup while confirming movement of the index 123 of the background unsharpness level indicator 126 on the viewfinder screen. According to manipulation of the up-key Sup, the index 123 shifts toward the higher level one stage after another over the marks 122a to 122e. The operator stops manipulating the up-key Sup when the index 123 is positioned at a desired background unsharpness level, whereupon the desired background unsharpness level of the operator's is set.

If the up-key Sup is in the OFF state (NO in Step #2200), it is discriminated whether the down-key Sdn is in the ON state in Step #2210. If the down-key Sdn is in the ON state (YES in Step #2210), the background unsharpness level is shifted toward the lower stages and set at a des i r e d stage in Step #2215. Consequently, this subroutine returns to Step #2015. At this time, manipulation of the down-key Sdn by the operator is similar to that of the up-key Sup by him/her. The operator is allowed to set a desired background unsharpness level by manipulating the down-key Sdn while confirming movement of the index 123 of the background unsharpness level indicator 126 on the viewfinder screen. If the down-key Sdn is in the OFF state (NO in Step #2210), this subroutine returns to Step #2015. An initial background unsharpness level, i.e., a background unsharpness level in a state where neither the up-key Sup nor down-key Sdn is manipulated, is set at level 3. However, it will be noted that the initial background unsharpness may be set at any desired level.

After execution of the "Background Unsharpness Level Setting Routine," the main routine proceeds to Step #2015 in which an indicator data is generated and outputted, and then returns to Step #2005. The indicator data, i.e., the set background unsharpness level Lt, is displayed in the background unsharpness level indicator 126.

The setting and displaying of the background unsharpness level are carried out when the switch S1 is in the OFF state. This arrangement is made for the following reason. The ON state of the switch S1 means that the operator intends to conduct an exposure operation. Accordingly, it cannot be considered very suitable to set the background unsharpness level when the switch S1 is in the ON state. Conversely, it may be considered suitable to set the background unsharpness level when the switch S1 is in the OFF state. Further, the background unsharpness level displayed in the indicator 126 when the switch S1 is in the ON state is a control background unsharpness level obtained as a result of an exposure control. The control background unsharpness level may be different from the one set by the operator. The same indicator is used to display these two different background unsharpness levels. In view of this, in this embodiment, an arrangement is such that the setting of the background unsharpness level is prohibited when the control background unsharpness level is displayed, i.e. the switch S1 is in the ON state so as to avoid confusion concerning the display data on the operator's side.

If the switch S1 is in the ON state (YES in Step #2005), input data are read in Step #2020. The input data include: brightness BV of the subject supplied from the light measuring circuit 109: film sensitivity SV supplied from the film information reader circuit 104; focal length fl, fully open aperture value AVoz, and maximum aperture value AVmax of the taking lens unit supplied from the lens information reader circuit 108; data representative of a current position of the taking lens unit supplied from the encoder 105: data representative of state (ON/OFF) of the switches S1 to S3, up-key Sup, and down-key Sdn; and minimum and maximum shutter speeds TVmin, TVmax.

After the reading of these input data in Step #2020, an exposure value EV is calculated based on the read brightness BV of the subject and the film sensitivity SV (EV=BV+SV) in Step #2025. Then, it is discriminated whether the background priority switch S3 is in the ON state, i.e., the background priority mode is set in Step #2030. If the switch S3 is in the OFF state, i.e., a normal photography mode is currently set (NO in Step #2030), a control aperture value AVc and a control shutter speed TVc are calculated based on the exposure value EV calculated in Step #2020 using a known method. Then, this routine proceeds to Step #2040 in which it is discriminated whether the release switch S2 is in the ON state. If the release switch S2 is in the OFF state (NO in Step #2040), this routine returns to Step #2005. On the other hand, if the release switch S2 is in the ON state (YES in Step #2040), the control aperture value AVc, control shutter speed TVc are outputted to the exposure circuit 110 which in turn executes an exposure operation in accordance with the received data in Step #2045. Consequently, this routine returns to Step #2005.

If the switch S3 is in the ON state, i.e., the background priority mode is currently set (YES in Step #2030), it is discriminated whether the focus mode changeover switch S4 is in the ON state in Step #2540. If the switch S4 is in the OFF state, i.e., the manual-focus mode is set (NO in Step #2540), an aperture value AVdp corresponding to a target background unsharpness level is fixedly set to 6 and a warning indication is displayed so as to advise the operator to change the focus mode over to the auto-focus mode in Step #2545. This is because data necessary for calculating the background unsharpness level are unobtainable in the manual-focus mode. The warning indication is displayed in the out-of-frame display unit 121 on the viewfinder screen as described above. Thereafter, this routine proceeds to Step #2585.

If, on the contrary, the switch S4 is in the ON state, i.e., the auto-focus mode is set (YES in Step #2540), a magnification β is calculated based on the data supplied from the encoder 105 in Step #2550. Then, read in Step #2555 is a target diameter Tδ of a circle of confusion of the background subject image (hereinafter referred to merely as target diameter Tδ corresponding to the target background unsharpness level Lt set in Step #2010. The target diameters Tδ corresponding to respective background unsharpness levels are set as follows: 1200 a m at level 5; 670 $\mu$m at level 4; 317 $\mu$ at level 3; 117 $\mu$m at level 2: and 25 $\mu$m at level 1.

Subsequently, calculated in Step #2560 is such a target aperture value AVdp as to realize the read target diameter Tδ. The calculation of the target aperture value AVdp is carried out in the follow steps. Firstly, an aperture value AV is calculated using the following equation, which is an application of the equation (1).

$$AV = fl \times \beta \times \{(1-/k)/T\delta\} \qquad (2)$$

where k denotes a distance factor. In this embodiment, the distance factor k is virtually determined in accordance with the β-k relationship shown in FIG. 24. It will be appreciated that the distance factor k may be calculated based on the measured distance to the background subject and distance to the main subject.

In accordance with the equation (2), with the target diameter Tδ being fixed, the longer the focal length fl of the taking lens unit or the larger the magnification β, the larger the main subject image becomes in the frame of film. In other words, as the aperture value AV becomes larger, a diaphragm is stopped down. Conversely, the larger the target diameter Tδ, the more the size of a lens aperture is increased. The calculated aperture value AV is converted into an APEX value using the following equation.

$$AVdp = 2 \times \log(AV) \qquad (3)$$

The purpose of calculating the target aperture value AVdp is to change the aperture value AV, accordingly the target aperture value AVdp, so that the target diameter Tδ is maintained at a fixed value despite the changes in focal length fl and magnification β.

After calculation of AVdp, it is discriminated whether the target aperture value AVdp is smaller than the fully open aperture value AVoz in Step #2565. If AVdp<AVoz (YES in Step #2565), the target aperture value AVdp is increased to AVoz in Step #2570. Then, this routine proceeds to Step #2585. If AVdp≧AVoz (NO in Step #2565), it is discriminated whether the target aperture value AVdp is greater than the maximum aperture value AVmax in Step #2575. If AVdp>AVmax (YES in Step #2575), the target aperture value is reduced to AVmax in Step #2580. If AVdp≦AVmax (NO in Step #2575), this routine proceeds to Step #2585.

Figure 33:
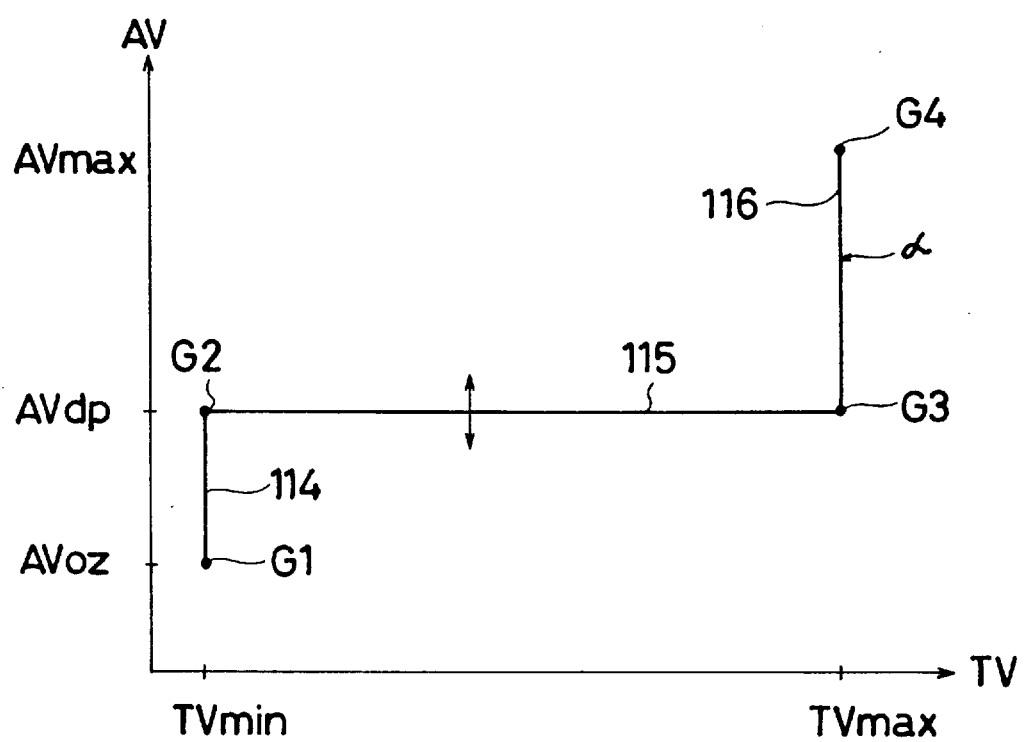
FIG. 33 is a diagram showing an auto-exposure program line.

In Steps #2585 to #2640, the lens aperture and shutter speed are controlled in accordance with the exposure value EV and target aperture value calculated in Steps #2025, #2560 and an auto-exposure control line α shown in FIG. 33 so that the set background unsharpness level Lt will be obtained in the final picture. The program line α shown in FIG. 33 is used exclusively in the background priority mode, and no program lines used in photography modes but the background priority mode are shown in this embodiment. In the program line α, G1 represents an intersection of the minimum aperture value AVoz and minimum shutter speed TVmin under which the camera can execute an exposure control, i.e., a minimum control limit; G4 represents an intersection of the maximum aperture value AVmax and maximum shutter speed TVmax under which the camera can execute the exposure control, i.e., a maximum control limit; G2 represents an intersection of the target aperture value AVdp and minimum shutter speed TVmin; and G3 represents an intersection of the target aperture value AVdp and maximum shutter speed TVmax.

Specifically, in Step #2585, it is discriminated whether the exposure value EV calculated in Step #2025 is below the minimum control limit G1. If the exposure value Ev is below the minimum control limit G1 (YES in Step #2585), the control aperture value AVc and control shutter speed TVc are respectively set to AVoz and TVmin in Step #2590. Then, this routine proceeds to Step #2640. If, on the other hand, the exposure value EV is at or above the minimum control limit G1 (NO in Step #2585), it is discriminated whether the exposure value EV is above the maximum control limit G4 in Step #2595. If the exposure value EV is above the maximum control limit G4 (YES in Step #2595), the control aperture value AVc and control shutter speed TVc are respectively set to AVmax and TVmax in Step #2600. Then, this routine proceeds to Step #2640. If the control value EV is at or below the maximum control limit G4 (NO in Step #2595), this routine proceeds to Step #2605.

In Steps #2605 and #2610, it is discriminated whether the exposure value EV lies in a first segment 114 of the auto-exposure program line a defined by points G1 and G2. If the exposure value EV lies in the first program line segment 114 (YES in Step #2610), the control aperture value AVc and control shutter speed TVc are respectively set to the aperture value AV calculated in Step #2605 and minimum shutter speed TVmin in Step #2615. Then, this routine proceeds to Step #2640. If the control value EV does not lie in the first program line segment 114 (NO in Step #2610), this routine proceeds to Step #2620. In Steps #2620 and #2625, it is discriminated whether the exposure value EV lies in a second program line segment 115 defined by G2 and G3. If the exposure value EV lies in the second program line segment 115 (YES in Step #2625), in Step #2630, the control aperture value AVc and control shutter speed TVc are respectively set to the target aperture value AVdp and the shutter speed TV calculated in Step #2620. In the program line α, the second program line segment 115 is vertically shiftable according to the background unsharpness level Lt set in the Step #2010. If the exposure value EV does not lie in the second program line segment 115 (NO in Step #2625), it means that the exposure value EV lies in a third program line segment 116 defined by G3 and G4. Accordingly, the control aperture value AVc and control shutter speed TVc are respectively set to (EV−TVmax) and TVmax in Step #2635, and this routine proceeds to Step #2640.

In Step #2640, firing of the flash device 102 is prohibited for the following reason. In the background priority mode, it counts how unsharp the background subject image is as a matter of course. However, the level of lighting of the background subject is uninfluenced by the firing of the flash device 102 since the light emitted therefrom in no way reaches the background subject. In addition, generally in a flash firing photography, the shutter speed is increased, making it difficult for the background subject image to become focused.

In Step #2645, indicator data representative of the aperture value and shutter speed to be displayed in the out-of-frame display unit 121 are generated based on the control aperture value AVc and control shutter speed TVc. Then, in Step #2650, the diameter δ is calculated based on the aperture value AV, magnification β, focal length fl, distance factor k using the equation (1). In addition, the background unsharpness level Lc is determined by checking in which range of the diameter δ in TABLE-4 the calculated diameter δ lies, and an indicator data representative of the determined background unsharpness level Lc to be displayed in the in-frame display unit 120 is generated. The indicator data generated in Steps #2645 and #2650 are outputted to the first and second display circuits 103 and 111 respectively in Step #2655. In Step #2660, the determined background unsharpness level Lc which is determined after the switch S1 is turned on is compared with the background unsharpness level Lt set by the operator in Step #2010. If Lc≠Lt (NO in Step #2660), in Step #2670, the warning indication is displayed in the indicator 127 so as to inform the operator of that the determined background unsharpness level as a result of exposure control differs from the set background unsharpness level. On the other hand, if Lc=Lt (YES in Step #2660), in Step #2665, the warning indication is cleared in the case where it was displayed in the preceding run. Consequently, this routine returns to Step #2040.

As described above, in the foregoing embodiments, visual effects a subject image provides in a final picture are calculated in accordance with the photographing conditions determined by an exposure mode selected from a plurality of those. Further, levels of the visual effects are designed to be displayed stepwise. Accordingly, an operator of the camera is allowed to confirm before an exposing operation what the final picture will look like in accordance with the photographing conditions set in a variety of exposure modes. Specifically, since a background unsharpness level is displayed in an aperture priority mode in which an aperture value is manually settable, it can be easily conducted to adjust to such an aperture value that will provide a desired unsharpness of the background image relative to the main subject image in the final picture. Likewise, since an action level is displayed in a shutter speed priority mode in which a shutter speed is manually settable, it can be easily conducted to adjust to such a shutter speed that will provide a desired active state of the main subject image. Accordingly, even unskilled operators, particularly utter novices in photography, can take pictures which will exhibit a desired degree of visual effect, and therefore can enjoy photographing.

Also, the background unsharpness level is determined based on the unsharpness of the background subject image relative to the main subject image calculated from the distance to the main subject, focal length of a taking lens unit, aperture value, and the distance to the background subject. Accordingly, it is made possible to use the obtained background unsharpness level for a desired purpose according to needs.

Further, the action level is determined as a level indicating the active state of the main subject image in the final picture based on a relative speed of the main subject and camera and a set shutter speed. Accordingly, it is made possible to use the obtained action level for a desired purpose according to needs.

Moreover, the obtained background unsharpness or action level is predictively displayed stepwise in a display unit. Accordingly, the operator is allowed to confirm how much unsharpness of the background subject image or active state of the main subject will be provided in the final picture before the exposing operation, and to obtain a final picture he/she aims. In this respect, the invention is capable of providing an easy-to-use camera for beginners in photography.

Furthermore, the visual effect level is displayed on/off according to a set exposure mode and further according to the operator's preference. This enables the display of the visual effect level to be cleared when unnecessary, whereby making the camera more power-saving. Particularly, in cameras wherein the visual effect level is displayed within a picture frame on a viewfinder screen, the above arrangement facilitates confirmation of an image to be photographed on the operator's side.

Further, according to the second embodiment of the invention, the operator is allowed to set a desired background unsharpness level before the exposing operation. This setting of the background unsharpness level enables the operator to obtain a final picture providing the aimed unsharpness of the background subject image regardless of the changes in a ratio of the main subject distance to the background distance (a distance factor) or focal length. Accordingly, the operator can easily take a picture which will provide a desired unsharpness of the background image even in the case where he/she is a beginner or a zoom lens is mounted to the camera.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A camera comprising:

a photographic controller for setting various photographing conditions which determine a state of a subject image to be obtained as a picture, the photographic controller including an exposure control device having a plurality of selectively settable exposure modes for automatically setting at least one exposure value based on brightness of a subject such that the plurality of exposure modes provide different respective types of visual effects relating to objects in the subject image;

a mode selection device for selecting one of the plurality of exposure modes;

a calculator for calculating an amount indicative of the state of the subject image in accordance with at least one characteristic of the scene to be photographed and the photographing conditions set by the photographic controller;

an estimation device for estimating a degree of the particular type of visual effects corresponding to a selected exposure mode, based on the calculated state amount; and a display device for displaying the estimated degree of visual effects.

2. A camera as defined in claim 1 wherein the photographic controller further includes a taking lens unit having a plurality of selectively settable focal lengths.

3. A camera as defined in claim 1 wherein the calculator includes a calculation unit for calculating the state amounts corresponding to the respective exposure modes, and the estimation device has estimation references corresponding to the respective exposure modes.

4. A camera as defined in claim 3 wherein the exposure control device includes an aperture priority mode in which an aperture value is set and a shutter speed is determined based on the brightness of the subject and the set aperture value, and the calculator calculates an amount of unsharpness of a background subject image relative to a main subject image as the state amount in accordance with the photographing conditions of the photographic controller when the aperture priority mode is selected.

5. A camera as defined in claim 3 wherein the exposure control device includes a shutter speed priority mode in which a shutter speed is set and an aperture value is determined based on the brightness of the subject and the set shutter speed, and the calculator calculates an amount of a blurring amount of a main subject image as the state amount in accordance with the photographing conditions of the photographic controller when the shutter speed priority mode is selected.

6. The camera of claim 1, wherein the estimated degree of each particular visual effect is displayed in the form of a scale.

7. A camera comprising:

a photography controller for setting various photographing conditions which determine a state of a subject image to be obtained as a picture, the photography controller including a plurality of control elements for determining an exposure value, said plurality of control elements being respectively operable to provide different types of visual effects relating to objects in the subject image;

a changer for selectively operating each one of the plurality of control elements to change the exposure value;

a calculator for calculating an amount indicative of the state of the subject image in accordance with at least one characteristic of the scene to be photographed and the photographing conditions set by the photography controller;

an estimation device for estimating a degree of the particular type of visual effects corresponding to an operated control element, based on the calculated state amount; and a display device for displaying the estimated degree of visual effects associated with the selected control element.

8. A camera as defined in claim 7 wherein one of the plurality of control elements is an aperture value control element, and the calculator calculates an amount of unsharpness of a background subject image relative to a main subject image as the state amount in accordance with the photographing conditions of the photography controller when the changer causes the aperture value control element to change the exposure value.

9. A camera as defined in claim 8 wherein the calculator includes a first detector for detecting a focal length of a taking lens unit of the photography controller and a second detector for detecting the distance to a main subject and a third detector for detecting the distance to a background subject, and calculates the amount of unsharpness of the background subject image relative to the main subject image as the state amount in accordance with the detected focal length, main subject distance, background subject distance and the changed aperture value.

10. A camera as defined in claim 7 wherein one of the plurality of control elements is a shutter speed control element, and the calculator calculates a blurring amount of a main subject as the state amount in accordance with the photographing conditions of the photography controller when the changer causes the shutter speed control element to change the exposure value.

11. A camera as defined in claim 10 wherein the calculator includes a first detector for detecting a focal length of a taking lens unit of the photography controller and a second detector for detecting a speed of the main subject relative to the photography controller by using light passing through the taking lens unit, and calculates the blurring amount of a main subject as the state amount in accordance with the detected focal length and relative speed of the main subject, and the set shutter speed.

12. The camera of claim 7, wherein the estimated degree of each particular visual effect is displayed in the form of a scale.

13. A camera comprising:

a photography device for setting various photographing conditions which determine a state of a subject image to be obtained as a picture, the photography device including a plurality of selectively settable exposure modes, at least some of which provide different respective types of visual effect relating to objects in the subject image;

a mode selector for selecting one of the plurality of the exposure modes;

a calculator for calculating an amount indicative of the state of the subject image in accordance with at least one characteristic of the scene to be photographed and the photographing conditions set by the photography device;

an estimator for estimating a degree of the particular type of visual effects corresponding to the selected exposure mode, based on the calculated state amount;

a display device for displaying the estimated degree of visual effects, the display device having an operative state of displaying the result of the estimator and an inoperative state of not displaying the result of the estimator; and a switch for switching the state of the display device between the operative state and the inoperative state in accordance with the exposure mode selected by the mode selector.

14. A camera as defined in claim 13 wherein the display device includes display units for displaying the visual effects corresponding to respective exposure modes, and the switch operates in association with the mode selector and switches the state of the display unit displaying the visual effects corresponding to the exposure mode selected by the mode selector to the operative state.

15. A camera as defined in claim 13 wherein the switch includes a manually operable element for designating an exposure mode in which the display device is switched to the inoperative state.

16. The camera of claim 13, wherein the estimated degree of each particular visual effect is displayed in the form of a scale.

* * * * *